US009285453B2

(12) United States Patent
Schantz et al.

(10) Patent No.: US 9,285,453 B2
(45) Date of Patent: Mar. 15, 2016

(54) METHOD OF NEAR-FIELD ELECTROMAGNETIC RANGING AND LOCATION

(71) Applicants: Hans Gregory Schantz, Huntsville, AL (US); Robert Edward DePierre, Huntsville, AL (US); Alfred Hans Unden, Owens Cross Roads, AL (US); Eric Alexander Richards, Madison, AL (US)

(72) Inventors: Hans Gregory Schantz, Huntsville, AL (US); Robert Edward DePierre, Huntsville, AL (US); Alfred Hans Unden, Owens Cross Roads, AL (US); Eric Alexander Richards, Madison, AL (US)

(73) Assignee: Q-Track Corporation, Huntsville, AL (US)

(*) Notice: Subject to any disclaimer, the term of this patent is extended or adjusted under 35 U.S.C. 154(b) by 421 days.

(21) Appl. No.: 13/692,721

(22) Filed: Dec. 3, 2012

(65) Prior Publication Data

US 2014/0062792 A1 Mar. 6, 2014

Related U.S. Application Data

(60) Continuation-in-part of application No. 13/153,640, filed on Jun. 6, 2011, now Pat. No. 8,326,451, which is a continuation-in-part of application No. 11/890,350, filed on Aug. 6, 2007, now Pat. No. 7,957,833, which (Continued)

(51) Int. Cl.
*G01S 5/02* (2010.01)
*G01S 13/75* (2006.01)
(Continued)

(52) U.S. Cl.
CPC ............. *G01S 5/02* (2013.01); *G01S 5/0252* (2013.01); *G01S 13/751* (2013.01); *G01S 13/878* (2013.01); *G06Q 10/087* (2013.01)

(58) Field of Classification Search
CPC .......... G01S 5/02; G01S 5/021; G01S 5/0252
USPC ........................ 342/174, 451, 457, 463–465; 455/456.1, 456.6, 457
See application file for complete search history.

(56) References Cited

U.S. PATENT DOCUMENTS 1,828,531 A 10/1931 Gage
2,422,107 A 6/1947 Luck et al.
(Continued)

FOREIGN PATENT DOCUMENTS

EP 0581434 2/1994
EP 1226729 A1 7/2002
(Continued)

OTHER PUBLICATIONS

Paramvir Bahl et al, "Radar: An In-Building RF-based User Location and Tracking System," IEEE INFOCOMM 2000, pp. 775-784.
Matthew Reynolds, "A Phase Measurement Radio Positioning System for Indoor Use," Masters Thesis, M.I.T., Feb. 1999.
Matthew Reynolds, "Low Frequency Indoor Radio Navigation," Doctoral DIssertation, M.I.T., Feb. 2003.
Kalmus, "A new guiding and tracking system," IRE Transactions on Aerospace and Navigational Electronics, Mar. 1962, vol. ANE-9, Issue 12, pp. 7-10.
Raab, :"Quasistatic magnetic-field technique for determining position and orientation," IEEE Transactions on Geoscience and Remote Sensing, vol. GE-19, Issue No. 4, Oct. 1981.
(Continued)

Primary Examiner — Dao Phan

(57) ABSTRACT

A method of near-field electromagnetic ranging and location exploits the long-wavelength, near-field characteristics of low-frequency RF signals like those in the vicinity of the AM broadcast band. These signals are robust against scattering from small objects and only mildly perturbed by the urban landscape including building structures. They are thus amenable to an RF fingerprinting approach exploiting a coarse calibration to capture the behavior of the gradually varying signal characteristics. In embodiments, a method of near-field electromagnetic ranging and location may exploit transmit tags transmitting to an infrastructure of locator-receivers, or locator-receiver tags detecting signals from an infrastructure of fixed transmitter beacons. In still further embodiments, fixed transmitter beacons may be supplemented by uncooperative signals sources including signals-of-opportunity like AM broadcast band signals.

10 Claims, 13 Drawing Sheets

Related U.S. Application Data is a continuation-in-part of application No. 11/473,595, filed on Jun. 23, 2006, now Pat. No. 7,755,552, which is a continuation-in-part of application No. 11/272,533, filed on Nov. 10, 2005, now Pat. No. 7,307,595, said application No. 11/890,350 is a continuation-in-part of application No. 11/215,699, filed on Aug. 30, 2005, now Pat. No. 7,414,571, which is a continuation-in-part of application No. 10/958,165, filed on Oct. 4, 2004, now Pat. No. 7,298,314, which is a continuation-in-part of application No. 10/355,612, filed on Jan. 31, 2003, now Pat. No. 6,963,301, said application No. 11/890,350 is a continuation-in-part of application No. 11/500,660, filed on Aug. 8, 2006, now Pat. No. 7,538,715, application No. 13/692,721, which is a continuation-in-part of application No. 13/436,956, filed on Apr. 1, 2012, application No. 13/692,721, which is a continuation-in-part of application No. 12/796,643, filed on Jun. 8, 2010, now Pat. No. 8,018,383, application No. 13/692,721, which is a continuation-in-part of application No. 12/843,002, filed on Jul. 23, 2010, now abandoned, which is a continuation-in-part of application No. 12/977,067, filed on Dec. 23, 2010, now Pat. No. 8,643,538, which is a continuation of application No. 12/563,960, filed on Sep. 21, 2009, now Pat. No. 7,859,452, which is a division of application No. 11/986,319, filed on Nov. 19, 2007, now Pat. No. 7,592,949, application No. 13/692,721, which is a continuation-in-part of application No. 12/834,821, filed on Jul. 12, 2010, now Pat. No. 8,922,440, application No. 13/692,721, which is a continuation-in-part of application No. 12/857,528, filed on Aug. 16, 2010, now Pat. No. 8,436,780.

(60) Provisional application No. 60/404,602, filed on Aug. 19, 2002, provisional application No. 60/404,604, filed on Aug. 19, 2002, provisional application No. 60/841,598, filed on Aug. 31, 2006, provisional application No. 61/470,735, filed on Apr. 1, 2011, provisional application No. 60/637,779, filed on Dec. 21, 2004.

(51) Int. Cl.
*G01S 13/87* (2006.01)
*G06Q 10/08* (2012.01)

(56) References Cited

U.S. PATENT DOCUMENTS

| | | | |
|---|---|---|---|
| 2,884,628 | A | 4/1959 | Loomis |
| 2,955,778 | A | 10/1960 | Beverage |
| 3,046,549 | A | 7/1962 | Kalmus |
| 3,121,228 | A | 2/1964 | Kalmus |
| 3,430,243 | A | 2/1969 | Evans |
| 3,526,866 | A | 9/1970 | Lubich |
| 3,644,825 | A | 2/1972 | Davis, Jr. et al. |
| 3,868,565 | A | 2/1975 | Kuipers |
| 3,983,474 | A | 9/1976 | Kuipers |
| 4,054,881 | A | 10/1977 | Raab |
| 4,314,251 | A | 2/1982 | Raab |
| 4,721,961 | A | 1/1988 | Busignies et al. |
| 4,808,923 | A | 2/1989 | Posseme |
| 5,307,072 | A | 4/1994 | Jones |
| 5,510,801 | A | 4/1996 | Engelbrecht et al. |
| 5,602,903 | A | 2/1997 | LeBlanc et al. |
| 5,809,063 | A | 9/1998 | Ashe |
| 5,977,913 | A | 11/1999 | Christ |
| 6,011,515 | A | 1/2000 | Radcliffe et al. |
| 6,026,304 | A | 2/2000 | Hilsenrath et al. |
| 6,108,557 | A | 8/2000 | Wax et al. |
| 6,154,657 | A | 11/2000 | Grubeck et al. |
| 6,249,680 | B1 | 6/2001 | Wax et al. |
| 6,282,426 | B1 | 8/2001 | Wang |
| 6,456,239 | B1 | 9/2002 | Werb et al. |
| 6,496,701 | B1 | 12/2002 | Chen et al. |
| 6,559,800 | B2 | 5/2003 | Rabinowitz et al. |
| 6,608,593 | B2 | 8/2003 | Holt |
| 6,674,403 | B2 | 1/2004 | Gray et al. |
| 6,691,074 | B1 | 2/2004 | Moriya et al. |
| 6,727,847 | B2 | 4/2004 | Rabinowitz et al. |
| 6,762,721 | B2 | 7/2004 | Halsey et al. |
| 6,879,286 | B2 | 4/2005 | Rabinowitz et al. |
| 6,963,727 | B2 | 11/2005 | Shreve |
| 7,043,999 | B2 | 5/2006 | Bernhard et al. |
| 7,096,148 | B2 | 8/2006 | Anderson et al. |
| 7,593,740 | B2 | 9/2009 | Crowley et al. |
| 7,609,164 | B2 | 10/2009 | Yamashita |
| 7,782,256 | B2 | 8/2010 | Smith |
| 7,809,805 | B2 | 10/2010 | Stremel et al. |
| 7,835,779 | B2 | 11/2010 | Anderson et al. |
| 2002/0126046 | A1 | 9/2002 | Counselman |
| 2007/0099625 | A1 | 5/2007 | Rosenfeld |
| 2008/0077326 | A1 | 3/2008 | Funk et al. |
| 2009/0146864 | A1 | 6/2009 | Zank et al. |

FOREIGN PATENT DOCUMENTS

| | | |
|---|---|---|
| WO | WO 88/09515 | 5/1987 |
| WO | WO2009/140768 A1 | 11/2009 |
| WO | WO2010/014803 A1 | 2/2010 |

OTHER PUBLICATIONS

Raab et al, "Magnetic position and orientation tracking system," IEEE Transactions on Aerospace and Electronic Systems, vol. AES-15, No. 5, Sep. 1979, pp. 709-717.

Kemp et al, "A new technique for the analysis of transient ELF electromagnetic disturbances within the Earth-ionosphere cavity," Journal of Atmospheric and Terrestrial Physics, 1971, vol. 33, pp. 567-572.

E. Martin, "Multimode radio fingerprinting for localization," 2011 IEEE Radio and Wireless Symposium, pp. 383-386.

Kenneth Fisher, "The Navigation Potential of Signals of Opportunity-Based TDoA Measurements," AFIT PhD Dissertation, 2005.

T.D.Hall, "Radiolocation Using AM Broadcast Signals," PhD Dissertation, MIT, 2002.

METHOD OF NEAR-FIELD ELECTROMAGNETIC RANGING AND LOCATION

RELATED APPLICATIONS

The present application is a continuation-in-part of U.S. patent application Ser. No. 13/153,640 titled: "Inventory control system and method," filed Jun. 6, 2011, now U.S. Pat. No. 8,326,451 issued Dec. 4, 2012 and its antecedents. The present application is a continuation-in-part of U.S. patent application Ser. No. 12/977,067 titled: "Near-field electromagnetic location system and method," filed Dec. 23, 2010 and its antecedents. The present application is a continuation in part of U.S. patent application Ser. No. 12/834,821 titled: "Space efficient magnetic antenna method," filed Jul. 12, 2010 and its antecedents. The present application is a continuation in part of U.S. patent application Ser. No. 12/857,528 titled: "Planar antenna system," filed Aug. 16, 2010 and its antecedents. The present application is a continuation-in-part of U.S. patent application Ser. No. 13/436,956 titled: "Directive electrically small antenna system and method," filed Apr. 1, 2012.

GOVERNMENT LICENSE RIGHTS

The U.S. Government has a paid up license in this invention and the right in limited circumstances to require the patent owner to license others on reasonable terms as provided for by the terms of contract D16PC20156 awarded by the Department of Homeland Security other grants and contracts.

BACKGROUND

1. Field of the Invention

The disclosures herein relate generally to location determining systems, and more specifically, to systems that determine location using radio signals.

2. Background of the Invention

Numerous systems have been developed throughout the years to determine location using radio signals. Some of these techniques include triangulation, radio ranging from a collection of direction finding measurements, passive and active tag ranging, time difference of arrival (TDOA) systems and global positioning systems (GPS), for example. These techniques rely on measurements in the "far field" of a radio transmitter. In other words, these measurements are performed at a substantial distance away from the radio transmitter in terms of radio signal wavelength.

The indoor and urban environment exert a substantial impact on the propagation of radio frequency signals. This complex environment is known to effectively scramble or even block the propagation of radio frequency signals, especially those in the VHF, UHF and microwave part of the radio spectrum. Rapid variations in amplitude and phase may occur as these signals scatter and interfere with one another in complex ways. Difficulties with multi-path radio signal reception are commonplace in this hostile environment.

For example, a network of sensors may be deployed throughout an area in which one desires to track personnel or assets. Signal strength measurements may localize a transmitter to a particular zone; however, positioning based on relative signal strength is inherently imprecise.

"RF fingerprinting" is one approach that a radio location system may use to overcome the complicated signal propagation of the urban environment. The motivation behind RF fingerprinting techniques is the hope that a sufficiently accurate map can be made to uniquely identify different transmit positions in the same way human fingerprints serve to uniquely identify different persons. One variation of the RF fingerprinting approach attempts to use multi-path signals arriving at an antenna array to localize a transmitter. Multi-path signals arriving at the antenna array are compared to a database of calibrated multipath signal signatures and corresponding locations. The location whose calibrated signal signature best matches the measured signature is selected as the most likely transmitter location. "RF fingerprinting" typically locates a mobile transmitter with respect to a network of receivers through which the mobile transmitter travels. This type of RF fingerprinting relies on the hope that the multi-path environment will be sufficiently stable and static to be repeatable. Unfortunately, multi-path environments are often unstable and dynamic, making location determination repeatability difficult in this type of system.

Improvements in radio location systems continue to be desirable including those systems that may operate in a complex propagation environment.

BRIEF SUMMARY OF THE INVENTION

Briefly, the present invention pertains to a method for determining an unknown position including the steps of (1) generating a plurality of calibration data sets, (2) generating a positioning data set, and (3) determining, by an information handling system, the unknown position based on a comparison of the plurality of calibration data sets to the positioning data set. Each calibration data set of the plurality of calibration data sets is generated by: (a) transmitting, by a beacon transmitter, a calibration transmission, (b) receiving, by a locator-receiver, the calibration transmission, (c) measuring, by the locator-receiver, a plurality of received signal characteristics of the calibration transmission to generate said calibration data set, and (d) associating, by an associator, said calibration data set with a known position. The positioning data set is generated by: (a) transmitting, by the beacon transmitter, a location transmission, (b) receiving, by the locator-receiver, the location transmission, and (c) measuring, by the locator-receiver, a plurality of received signal characteristics of the location transmission to generate said positioning data set associated with the unknown position.

Signal characteristics may include a plurality of signal amplitudes, a comparison of signal amplitudes, or a comparison of signal phases. In a preferred embodiment, the calibration transmission and the location transmission are near-field signals. In some embodiments, the beacon transmitter occupies the unknown position, while in others, the locator-receiver occupies the unknown position. If the locator-receiver occupies the unknown position, the beacon transmitter may be an uncooperative source of electromagnetic radiation, and in further embodiments, the uncooperative source of electromagnetic radiation is an AM broadcast signal.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION OF THE PREFERRED EMBODIMENTS

Overview of the Invention

Figure 1A:
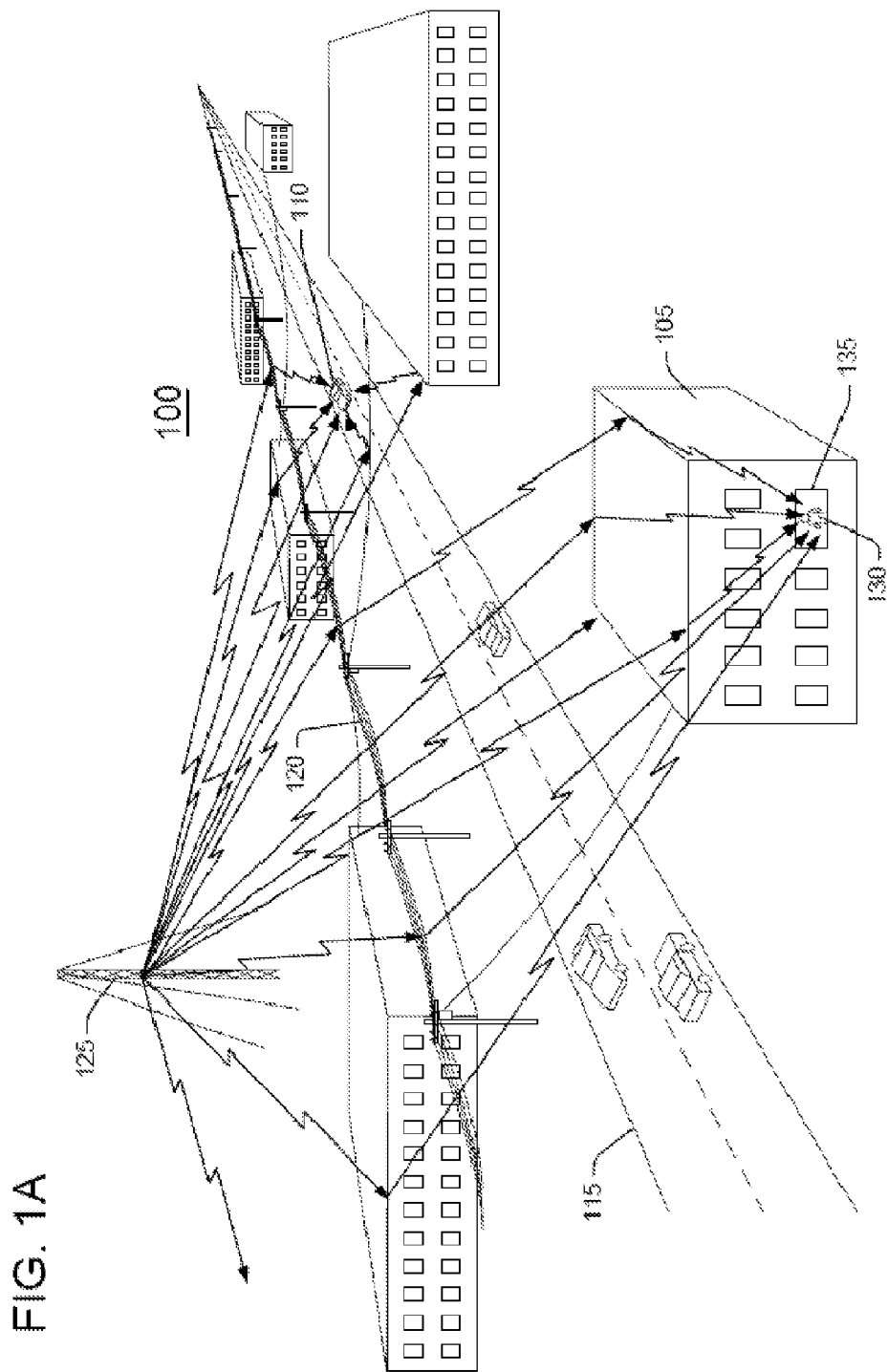
FIG. 1A is a representation of a complex urban RF propagation environment.

Real-time location system (RTLS) devices track an object's movement and measure the object's location to sufficient accuracy to identify the position of the object within the correct bin or region in the storage area or elsewhere. An important sub-set of RTLS use active wireless devices. Active RTLS may employ 2.4 GHz signals (for instance, Wi-Fi®, Bluetooth®, or ZigBee®), optical, IR, or laser signals, acoustic signals, ultra-wideband (UWB) signals, near-field signals, or other wireless signals. Active RTLS methods may include time-of-flight, time-difference-of-arrival, Received Signal Strength Indicator (RSSI), multilateration, line-of-sight, direction finding, radar, RF fingerprinting, or other methods.

Incumbent location providers take high frequency, short wavelength wireless systems, like Wi-Fi or UWB, that were optimized for high data rate communications, and they try to use them to solve the challenging problem of indoor wireless location. But location and communication are two fundamentally different problems requiring fundamentally different solutions, particularly in the most challenging RF propagation environments.

Applicants have pioneered a solution. NFER® technology offers a wireless physical layer optimized for real-time location in the most RF hostile settings. NFER® systems exploit near-field behavior within about a half wavelength of a tag transmitter to locate a tag to an accuracy of 1-3 ft, at ranges of 60-200 ft, all at an infrastructure cost of $0.50/sqft or less for most installations. NFER® systems operate at low frequencies, typically around 1 MHz, and long wavelengths, typically around 300 m.

Low frequency signals penetrate better and diffract or bend around the human body and other obstructions. This physics gives NFER® systems long range. There's more going on in the near field than in the far field. Radial field components provide the near field with an extra (third) polarization, and the electric and magnetic field components are not synchronized as they are for far-field signals. Thus, the near field offers more trackable parameters. Also, low-frequency, long-wavelength signals are resistant to multipath. This physics gives NFER® systems high accuracy. Low frequency hardware is less expensive, and less of it is needed because of the long range. This makes NFER® systems more economical in more difficult RF environments.

Near field electromagnetic ranging was first fully described in applicant's "System and method for near-field electromagnetic ranging" (Ser. No. 10/355,612, filed Jan. 31, 2003, now U.S. Pat. No. 6,963,301, issued Nov. 8, 2005). This application is incorporated in entirety by reference. Some of the fundamental physics underlying near field electromagnetic ranging was discovered by Hertz [Heinrich Hertz, Electric Waves, London: Macmillan and Company, 1893, p. 152]. Hertz noted that the electric and magnetic fields around a small antenna start 90 degrees out of phase close to the antenna and converge to being in phase by about one-third to one-half of a wavelength. This is one of the fundamental relationships that enable near field electromagnetic ranging. A paper by one of the inventors [H. Schantz, "Near field phase behavior," 2005 IEEE Antennas and Propagation Society International Symposium, Vol. 3A, 3-8 Jul. 2005, pp. 237-240] examines these near-field phase relations in further detail. Link laws obeyed by near-field systems are the subject of another paper [H. Schantz, "Near field propagation law & a novel fundamental limit to antenna gain versus size," 2005 IEEE Antennas and Propagation Society International Symposium, Vol. 3B, 3-8 Jul. 2005, pp. 134-137]. In addition to an active RTLS tag (or fixed locator—mobile beacon) architecture, the teachings of U.S. Pat. No. 6,963,301 encompass a passive location tag (or fixed beacon—mobile locator) architecture. In this architecture, the passive location tag (or passive RTLS tag) is a receiver that may be incorporated or associated with a vehicle or person to provide position information from signals emitted by fixed transmit beacons. A beacon may be an uncooperative source of electromagnetic radiation, like a signal from an AM broadcast station or other signal-of-opportunity. In the sense taught by Applicants, a "passive RTLS tag" is passive in the sense that it does not emit signals in the process of obtaining location data, rather it receives and characterizes signals so as to determine location of an associated mover. Determination of location may be performed either locally (within the passive RTLS tag) or remotely (by conveying signal characterization data to a remote server for location determination).

Complicated propagation environments do tend to perturb the near-field phase relations upon which NFER® systems rely. Applicants have overcome this problem using calibration methods described in "Near-field electromagnetic positioning system and method" (Ser. No. 10/958,165, filed Oct. 4, 2004, now U.S. Pat. No. 7,298,314, issued Nov. 20, 2007).

Additional calibration details are provided in applicant's "Near-field electromagnetic positioning calibration system and method" (Ser. No. 11/968,319, filed Nov. 19, 2007, now U.S. Pat. No. 7,592,949, issued Sep. 22, 2009). Still further details of this calibration are provided in applicant's co-pending "Near-field electromagnetic calibration system and method" (Ser. No. 12/563,960 filed Sep. 21, 2009, now U.S. Pat. No. 7,859,452, issued Dec. 28, 2010).

Applicant's unique algorithms enable innovative techniques for displaying the probability density and other aspects of location information, as described in applicant's "Electromagnetic location and display system and method," (Ser. No. 11/500,660, filed Aug. 8, 2006, now U.S. Pat. No. 7,538,715, issued May 26, 2009).

Applicants discovered that orthogonal magnetic antennas offer unique advantages for transmission and reception in real-time location systems and elsewhere. Details may be found in "Near-field location system and method," (Ser. No. 11/272,533, filed Nov. 10, 2005, now U.S. Pat. No. 7,307,595, issued Dec. 11, 2007). Additional compact antenna designs are shown in applicant's "Space efficient magnetic antenna system," (Ser. No. 11/473,595, filed Jun. 22, 2006, now U.S. Pat. No. 7,755,552 issued Jul. 13, 2010). Other antenna concepts of value in an RTLS and elsewhere are disclosed in Applicant's co-pending "Planar antenna system," (Ser. No. 12/857,528, Aug. 16, 2010), and "Space efficient magnetic antenna method," (Ser. No. 12/834,821, filed Jul. 12, 2010). Applicant's "Directive electrically small antenna system and method," (Provisional Patent Application 61/470,735 filed Apr. 1, 2011) presents further antennas of use in conjunction with an RTLS.

Further, the phase properties of near-field signals from orthogonal magnetic and other multiple antenna near-field transmission signals enable additional phase comparison states that can be used for location and communication, as described in applicant's co-pending "Multi-state near-field electromagnetic system and method for communication and location," (Ser. No. 12/391,209, filed Feb. 23, 2009).

Near-field electromagnetic ranging is particularly well suited for tracking and communications systems in and around standard cargo containers due to the outstanding propagation characteristics of near-field signals. This application of NFER® technology is described in applicant's "Low frequency asset tag tracking system and method," (Ser. No. 11/215,699, filed Aug. 30, 2005, now U.S. Pat. No. 7,414,571, issued Aug. 19, 2008).

Applicants have also discovered that near-field electromagnetic ranging works well in the complicated propagation environments of nuclear facilities and warehouses. An NFER® system provides the RTLS in a preferred embodiment of applicants' co-pending "System and method for simulated dosimetry using a real-time location system" (Ser. No. 11/897,100, filed Aug. 29, 2007, now abandoned). An NFER® system also provides the real-time location system in a preferred embodiment of applicants' "Asset localization, identification, and movement system and method" (Ser. No. 11/890,350, filed Aug. 6, 2007, now U.S. Pat. No. 7,957,833 issued Jun. 7, 2011) and in applicants' "Inventory control system and method" (Ser. No. 13/153,640, filed Jun. 6, 2011, now U.S. Pat. No. 8,326,451 issued Dec. 4, 2012).

In addition, applicants recently discovered that AM broadcast band signals are characterized by "near field" behavior, even many wavelengths away from the transmission tower. These localized near-field signal characteristics provide the basis for a "Method and apparatus for determining location using signals-of-opportunity" (Ser. No. 12/796,643, filed Jun. 8, 2010, now U.S. Pat. No. 8,018,383 issued Sep. 13, 2011).

The techniques therein disclosed enable an RTLS comprising a mobile tag receiver employing signals-of-opportunity to determine precise location or position. More generically, passive receiver tag RTLS employing an uncooperative signal is described in Applicant's co-pending "Near-field electromagnetic location system and method," (Ser. No. 12/977,067, filed Dec. 23, 2010) along with other improvements in the RTLS arts.

Applicants also discovered that a path calibration approach can yield successful location solutions particularly in the context of first responder rescues, as detailed in applicant's "Firefighter location and rescue equipment" (Ser. No. 13/021,711, filed Feb. 4, 2011). Applicant's "Malicious attack response system and method," (Ser. No. 12/843,002 filed Jul. 23, 2010) discusses innovative means of securing a computer network, such as location-based service or system, from an attack outside the network. All the above referenced US Patents are incorporated herein by reference in their entirety.

Near-Field Electromagnetic Ranging and Location Using Signals-of-Opportunity

FIG. 1A is a representation of a complex urban RF propagation environment 100 that includes multiple buildings, such as building 105, and a vehicle 110 travelling along a roadway 115 between the buildings. Electrical power lines 120 are situated along roadway 115. A distant radio tower 125 transmits standard broadcast AM radio signals from a transmitter (not shown) to propagation environment 100. Radio tower 125 may be several kilometers away from vehicle 110 and building 105. A person 130 in a window 135 of building 105 and vehicle 110 are potential reception locations for the signals that distant tower 125 transmits. Buildings such as building 105, electrical power lines 120 and other obstacles cause localized distortions and deviations in medium and low frequency radio signals from tower 125. When such medium and low frequency radio signals propagate through urban environment 100, they couple to scatterers such as building 105 and power lines 120 thus causing the scatterers to resonate. This local resonance behavior introduces near field components to what would otherwise be far field components from distant radio tower 125. These local scatterers effectively act as re-transmitters that introduce near field components that are detectable by the disclosed signal-of-opportunity location detector (SOLD) as discussed in more detail below. The coupling and scattering obstructions in the propagation environment act as secondary sources for reactive, near field energy. The localized distortions and deviations of medium and low frequency radio signals from theoretically ideal behavior do themselves provide the basis for a highly accurate geo-location system.

In more detail, urban environments distort the propagation of medium and low frequency radio signals because such environments include entities with conductors exhibiting an appropriate size to interact with these radio signals. These distortion-introducing entities may be referred to as scatterers by an analogy to the quasi-optical behavior of higher frequency shorter wavelength radio waves. However, the coupling of interest is principally a near field interaction taking place on a scale comparable to a distance about .lamda./2.pi. away from a scatterer. With a sufficiently sensitive detector, near field behavior may be detectable to as far as approximately one wavelength away from the local scatterer in the propagation environment.

The signals employed by the disclosed location detection system are defined as "signals-of-opportunity" signals in that they are not placed in the local environment 100 by distant radio transmitting tower 125 for the purpose of radio location.

Rather, distant radio transmitting tower 125 transmits radio signals to environment 100 for the purpose of radio communication of programming content such as talk, music and other entertainment forms. The inventors have discovered that these radio signals, after being perturbed by the local environment, are opportunistically present and useable for radio location detection purposes. These radio signals are thus "signals-of-opportunity" that will be used by the disclosed location detection methodology for a purpose other than their intended purpose of communication.

The preferred embodiment of the disclosed SOLD radio location system employs a SOLD in the AM standard broadcast band. The ubiquity and relatively high power of such signals are conducive to a SOLD receiver. However, the teachings herein are also applicable for radio waves of any frequency in which the wavelengths are long compared to the typical distance between scatterers in the propagation environment and the locations at which one desires to make a location determination. In an urban environment, it is expected that radio signals up to and including the HF band (approx. 3-30 MHz) may be of some utility for a signal-of-opportunity radio location detector. The teachings herein may also apply to using unintentional or incidental signals-of-opportunity. In some propagation environments that are particularly dense with scatterers, the teachings herein may also apply to FM and other broadcast signals with a frequency up to approximately 100 MHz and/or wavelengths of down to approximately 3 meters, depending on the particular application.

As stated above, FIG. 1A shows a conceptual representation of an urban RF propagation environment 100 that includes buildings 105 and electrical lines 120 that tend to distort standard broadcast band AM radio signals. This distortion remains relatively localized and for this reason enables accurate geo-location. Because the near field perturbations in an otherwise far field radio signal result from interactions with fixed objects in the environment 100 like buildings 105 and electric power lines 120, the disclosed location detection system that maps and characterizes these perturbations exhibits good accuracy and repeatability. For example, accurate location detection and tracking is possible within the near-field range of the perturbing sources, for example within approximately .lamda./2.pi. to as far away as approximately .lamda. in some embodiments. These perturbing sources effectively act as retransmitters of the AM radio signal, albeit in distorted, perturbed forms. Moreover, spatial variability in AM broadcast band noise levels from location to location, enables tracking on the noise background, including incidental or unintentional radio emissions from local or other noise sources. It was found that in many cases, the noise levels observed in environment 100 are sufficiently stable over suitable long time periods to act as a source of additional geo-location information.

Figure 1B:
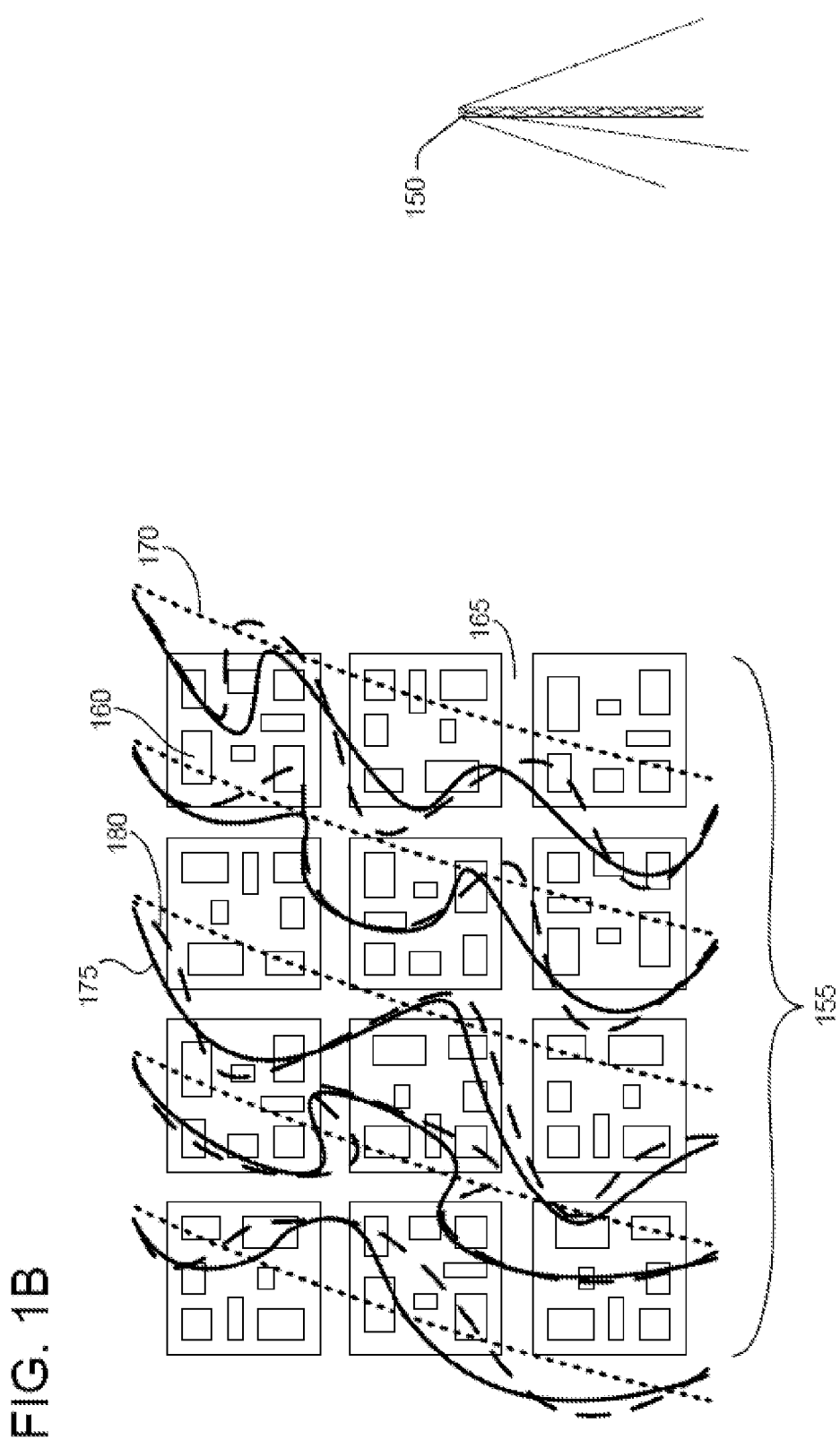
FIG. 1B is a representation of radio signal contours in an open field environment and in a complex environment.

FIG. 1B is a representation of radio propagation in an open field environment and radio propagation in a complex environment such as an urban environment with multiple buildings. A distant transmitter tower 150 transmits radio signals to an urban environment 155 that includes multiple buildings such as building 160, multiple streets such as street 165 and electric power lines (not shown). Short dashed lines 170 represent signal contours that the field generated by transmitter tower 150 would exhibit in environment 155 if environment 155 were an open field with no buildings, electric lines and other obstructions. Solid lines 175 and long dashed lines 180 respectively represent the distorted magnetic and electric field signal contours that the radio signal generated by transmitter tower 150 exhibits in environment 155 due to local perturbations of the radio signal caused by interaction with buildings, electric lines and other obstructions. Environment 155 is situated within what is considered to be the far field of the signals transmitted by transmitter tower 150. The buildings and other structures within environment 155 provide perturbing sources that distort and effectively locally retransmit the radio signals from distant tower 150.

In more detail, FIG. 1B illustrates signal propagation in a hypothetical multi-block urban environment 155. In an ideal open field environment, signals from a distant transmitter 150 might yield uniform iso-phase contours, i.e. short dashed lines 170. As signals from distant transmitter 150 propagate through the hypothetical multi-block urban environment 155 of FIG. 1B, electric and magnetic signals components couple differently to the scatterers or perturbers within the urban environment. This results in electric iso-phase contours (solid lines 175) and magnetic iso-phase contours (long dashed lines 180) that are different from each other and from the uniform iso-phase contours 170 expected in an ideal open field environment. These phase perturbations, depicted in FIG. 1B also imply amplitude perturbations of signals from distant transmitter 150. The disclosed location detection methodology teaches exploiting these phase and amplitude perturbations (caused by signal propagation through urban, industrial, indoor, and other environments) to provide location information. Accurate location detection and tracking is possible within the near-field range of the perturbing sources.

Figure 2:
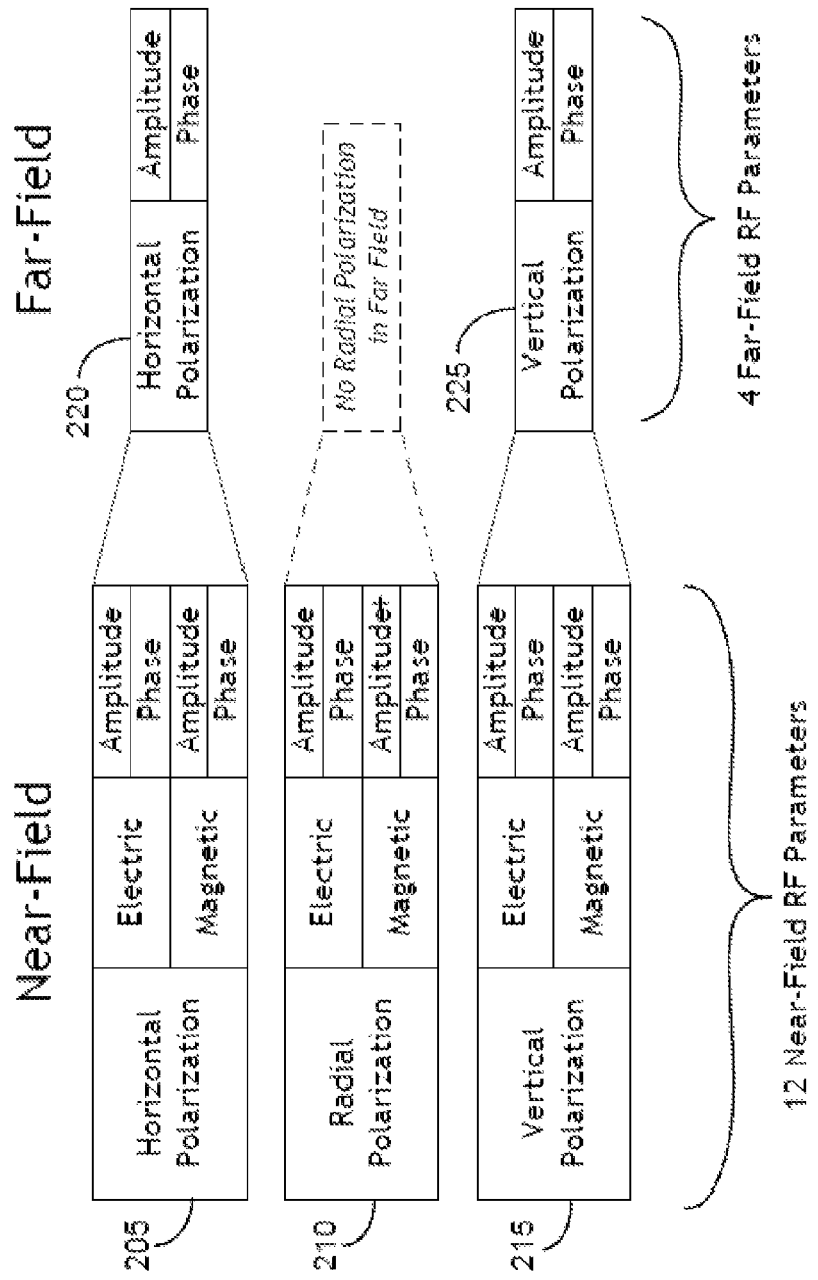
FIG. 2 is a representation of 12 independent physical parameters that near field signals exhibit and the up to 4 parameters that a far field signal may exhibit.

FIG. 2 is a representation of the 12 independent physical parameters that near field signals exhibit that may be usable for geo-location purposes and the up to 4 parameters that a far field signal may exhibit. The near field exhibits a very complex structure including components such as a horizontal polarization 205, a vertical polarization 210 and a radial polarization 215. Each of these polarization components exhibits an electric field and a magnetic field within the near field of the local perturbing source. Each of these 6 electric and magnetic fields exhibits distinctive amplitude and phase signal characteristics. Thus, the near field includes up to 12 distinctive signal characteristics that the disclosed radio location system may employ. In contrast, the far field includes a horizontal polarization 220 and a vertical polarization 225, each of which exhibits respective amplitude and phase characteristics. In the far field, the electrical and magnetic field components have synchronized or merged. Thus, the far field may include only up to 4 signal characteristics that may be usable for location detection. Consequently, the near field includes more trackable parameters or signal characteristics than the far field. Transverse polarizations are characterized as "vertical" and "horizontal." Equivalently, one could define these polarizations as circular (clockwise and counter-clockwise) or any other orthogonal separation of polarization components.

From FIG. 2, it is seen that the near field is a much more complex structure than the far field of the radio signals transmitted by tower 150 of FIG. 1B. The near field includes a third polarization, namely radial polarization 210 in which the electric and magnetic field components have not yet merged to form a 376.7 ohm impedance free space electromagnetic wave. We have discovered that standard broadcast band AM signals exhibit near field behavior when they encounter scatterers such as obstructions even many wavelengths away from transmitting tower 150. Despite being many wavelengths away from tower 150 at distances that would normally be within the far field zone, most locations in environment 100 are within near field range of local scatterers, i.e. local perturbers such as buildings, electric power lines and other obstructions.

By comparing particular near field properties or near field signal characteristics, including field impedance (the ratio of electric field to magnetic field intensity), phase and amplitudes of different field components, and by measuring the common-mode differences between these components, one embodiment of the disclosed radio location system obtains stable, robust RF data that is usable for location determination. One embodiment of the disclosed radio location determining system requires neither precise timing nor precise synchronization between and among a cooperative network of receivers. The disclosed radio location determining system is a signal-of-opportunity location detector (SOLD) that employs these near field signal characteristics of distant signals-of-opportunity that impinge on local scatterers or perturbers in local environment 100. The signal characteristics recorded in the reference data set 312, discussed below with respect to FIG. 3, may include amplitude information, amplitude differences information or phase differences information, for example.

Figure 3:
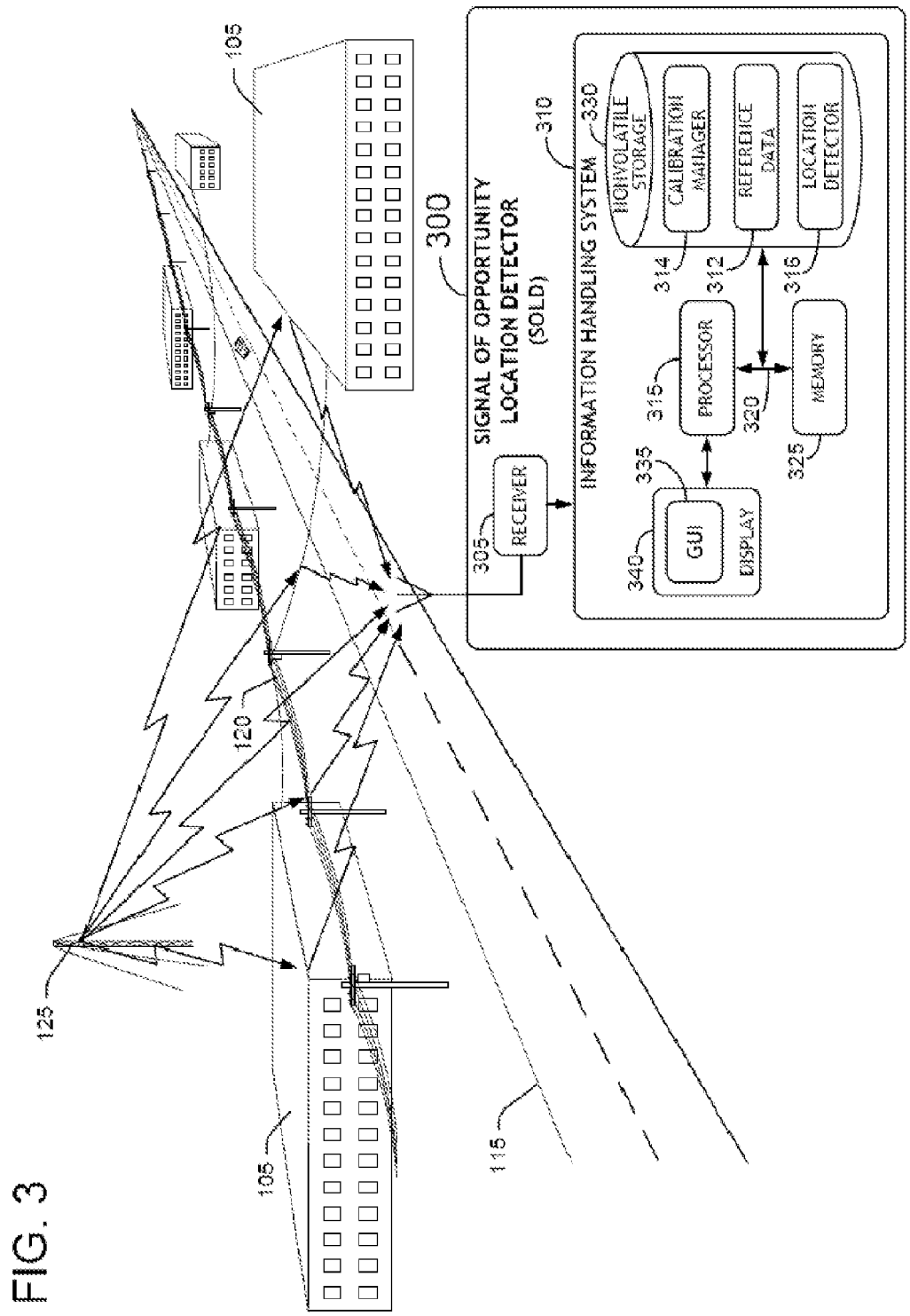
FIG. 3 is a simplified block diagram of one embodiment of the disclosed signal-of-opportunity-detector (SOLD).

FIG. 3 is a simplified block diagram of a SOLD 300. SOLD 300 includes a receiver 305 that detects signals of interest transmitted by tower 125 and other distant transmitter towers (not shown). At a high level, SOLD 300 detects and compares signal characteristics of the received signal with a reference data set 312 to determine the location of SOLD 300. This is the "location detection mode" of SOLD 300. In one embodiment, the reference data set 312 is determined by moving SOLD 300 to various selected locations in the propagation environment to build up calibration or reference data set 312. This is the "calibration mode" of SOLD 300. Reference data set 312 includes signal characteristics information for each selected location, as described in more detail below. In one embodiment, this collection of calibration data may be performed with reference to an absolute coordinate system or map.

Figure 5:
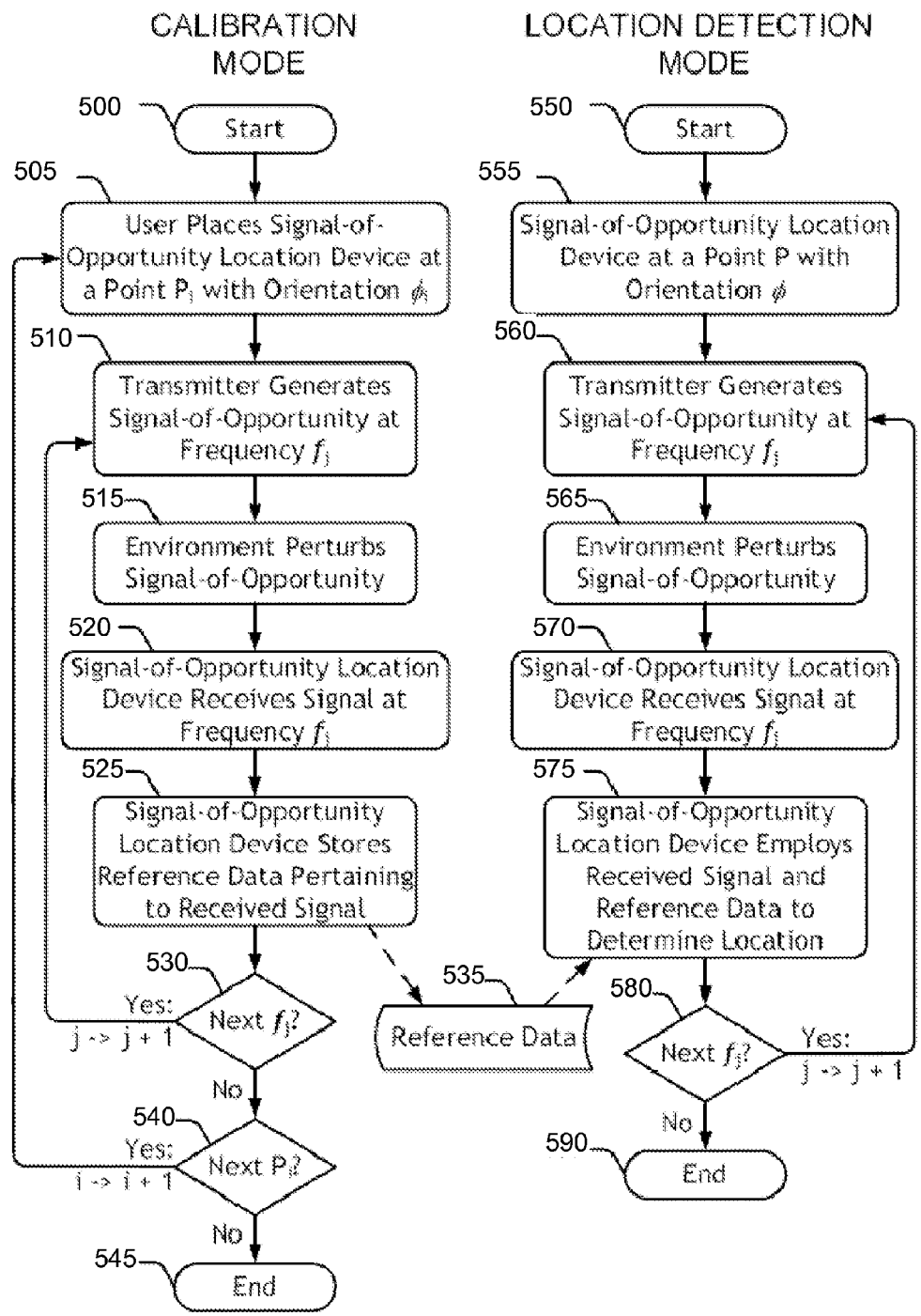
FIG. 5 is a flowchart that illustrates a representative "calibration mode" on the left side and a representative "location detection mode" on the right side.
Figure 14:
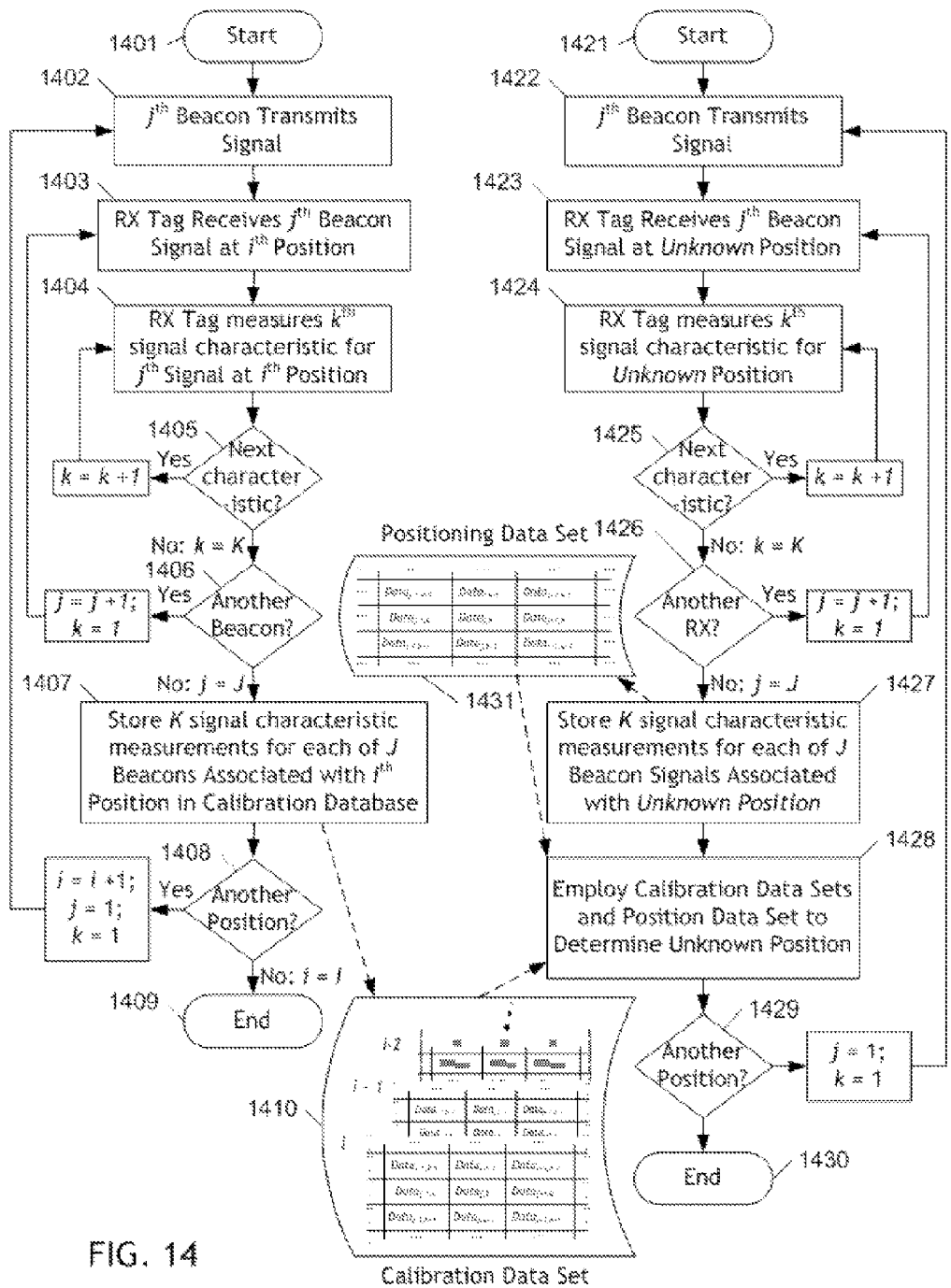
FIG. 14 is a flowchart for Fixed Beacon Transmitter, Mobile Locator-Receiver Near Field Electromagnetic Ranging and Location that illustrates a representative "calibration mode" on the left side and a representative "location detection mode" on the right side.

As seen in FIG. 3, SOLD 300 may include an information handling system (IHS) 310 with a processor 315 that couples via a bus 320 to a memory 325 and nonvolatile storage 330. Nonvolatile storage 330 stores reference data set 312. During calibration mode, processor 315 employs a calibration manager 314 to process the signal characteristics information that it receives from receiver 305 to build reference data set 312. Calibration manager 314 stores signal characteristics information, such as amplitude, amplitude differences and phase differences for each calibration location in reference data set 312. IHS 310 includes a location detector 316 that is used after reference data set 312 is built up to locate SOLD 300 in the propagation environment. Location detector 316 compares current signal characteristics information at a particular location in the propagation environment with the signal characteristics information in reference data set 312 to find the best match. The best match provides information with respect to the current location of SOLD 300. In one embodiment, processor 315 generates a graphical user interface (GUI) 335 for display on display 340. GUI 335 may show the current location of SOLD 300 on a map for easy visualization by the user. Calibration manager 314 and location detector 316 may be implemented in software, hardware or firmware, depending upon the particular application. More detail with respect to the operation of calibration manager 314 is shown in the flowcharts of FIGS. 5 and 14. More detail with respect to the operation of location detector 316 is shown in the flowcharts of FIGS. 5 and 14.

IHS 310 may also include I/O devices (not shown) such as a keyboard and mouse for inputting information and instructions to SOLD 300 and a network adapter such as a wireless network adapter to connect SOLD 300 to other systems. In one embodiment, reference data 312 may be stored remotely from SOLD 300, for example, on a remote server or other IHS that connects to the SOLD via the Internet. In that embodiment, calibration manager 314 stores reference data, i.e. signal characteristics information, on the remote server and location detector 316 retrieves the stored signal characteristics information from the remote server via a network such as a wireless network.

The particular IHS 310 that SOLD 300 employs may take many forms. For example, IHS 310 may take the form of a portable, laptop, notebook, netbook, tablet or other form factor computer or data processing system. IHS 310 may take still other form factors such as a personal digital assistant (PDA), a portable telephone device, a communication device or other devices that include a processor, memory and display.

In one embodiment, while in calibration mode, SOLD 300 is moved from location to location in a propagation environment and received signal characteristics such as amplitude, amplitude differences and phase differences are determined at each location. The received signal characteristics are stored as calibration or reference data set 312 for later location determination activity. Each location at which SOLD 300 performs a determination of received signal characteristics during calibration mode may be referred to as a calibration location or calibration point. A sufficiently dense calibration, i.e. calibration locations being sufficiently close together in the local propagation environment, enables accurate interpolation to determine location between calibration locations. For instance, one may subdivide the tracking area or environment into triangles at whose vertices lie calibration points using the process of DeLauney triangulation. Each triangle defines a plane within which received parameters such as amplitude, amplitude differences, or phase difference may be readily interpolated from the values at the vertices of the triangle.

In an alternative embodiment, while in calibration mode, SOLD 300 may be moved along a particular path through the propagation environment to characterize the path for future travel by SOLD 300 using a linear interpolation of signal characteristics information between calibration locations. This approach is useful for calibrating an inertial location determining system. Although the SOLD may not be able to determine an absolute location in this embodiment, the SOLD can determine if it has returned to an earlier location and orientation, allowing for removal or compensation of whatever drift may have accumulated in an accelerometer or gyro since the time that the SOLD was last at that relative location.

In another alternative embodiment, IHS 310 need not be separate from receiver 305. In that embodiment, IHS 310 may be integrated within receiver 305 such that receiver 305 includes one or more of processor 315, memory 325, nonvolatile storage 330 and display 340.

Figure 4:
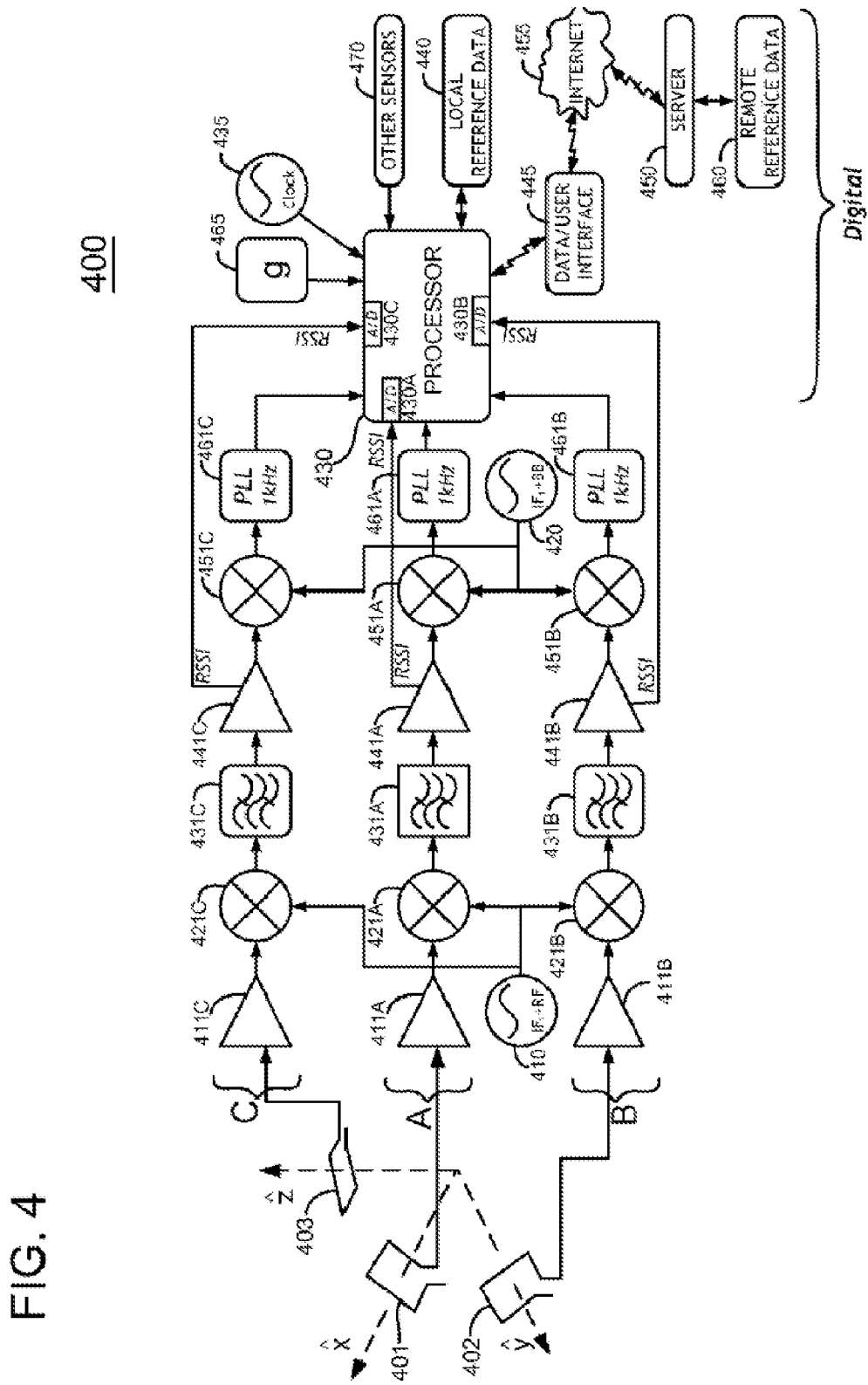
FIG. 4 is a block diagram of a preferred embodiment of a super-heterodyne SOLD receiver.

FIG. 4 is a block diagram of a preferred embodiment of a super-heterodyne SOLD receiver 400. SOLD receiver 400 receives and measures all three magnetic field components of the radio signal at the point of reception, i.e. the magnetic field components of the horizontal, vertical and radial polarizations of the radio signal. Magnetic antennas 401, 402, and 403 are mutually orthogonal and cooperate so as to detect orthogonal vertical, horizontal, and radial magnetic field components depending on an orientation of axes x, y, z with respect to the orthogonal magnetic field components. One example of a magnetic antenna useful as magnetic antennas 401, 402 and 403 is a loop antenna. Magnetic antennas 401, 402 and 403 are orthogonally situated with respect to one another.

SOLD 400 includes 3 magnetic field channels A, B and C oriented along 3 orthogonal axes x, y and z, respectively. Channel A is representative of the 3 channels and is now discussed. In channel A, magnetic loop antenna 401 couples to an RF preamplifier 411A. Mixer 421A mixes the signal from first local oscillator 410 (at $IF_1+RF$) with the preamplified RF signal up to a first intermediate frequency ($IF_1$). Bandpass filter 431A provides filtering and amplifier 441A provides additional amplification. Mixer 451A mixes the signal from amplifier 441A (at $IF_1$) with the signal from second local oscillator 420 (at $IF_1+BB$), down to baseband BB. Phase lock loop PLL 461A cooperates with mixer 451A to provide the baseband signal BB to processor 430. PLL 461A improves signal capture and stability in magnetic field channel A of SOLD 400. Amplifier 441A provides a received signal strength indicator (RSSI) signal to analog to digital (A/D) converting input 430A of processor 430. A clock 435 couples to processor 430 to provide a time base thereto.

Magnetic field channel B includes several components analogous to components of magnetic field channel A. These components are similarly numbered except with a B designation following the component number. More particularly, magnetic field channel B includes a preamplifier 411B, mixer 421B, bandpass filter 431B, amplifier 441B, mixer 451B, and PLL 461B. PLL 461B provides the down-converted baseband signal BB to processor 430. Amplifier 441B provides a received signal strength indicator (RSSI) signal to analog to digital (A/D) converting input 430B of processor 430.

Magnetic field channel C includes several components analogous to components of channel A and B. These components are similarly numbered except with a C designation following the component number. More particularly, magnetic field channel C includes a preamplifier 411C, mixer 421C, bandpass filter 431C, amplifier 441C, mixer 451C, and PLL 461C. PLL 461C provides the down-converted baseband signal BB to processor 430. Amplifier 441C provides a received signal strength indicator (RSSI) signal to analog to digital (A/D) converting input 430C of processor 430. In this manner, processor 430 receives signal information from magnetic field channels A, B and C.

When SOLD 400 operates in calibration mode collecting signal information at different calibration locations, processor 430 stores reference data in local reference data store 440. Local reference data store 440 includes signal characteristics information for the various calibration locations. SOLD 400 includes a data/user interface 445 that may include a graphical user interface (GUI) display. In one embodiment, the data interface portion of interface 445 couples to a remote server 450 via the Internet 455 or other network. SOLD 400 may store reference data as remote reference data 460 at server 450. In this manner, the user of SOLD 400 or another SOLD may access the remote reference data 460 to determine the location of that user's SOLD.

SOLD 400 may include an accelerometer 465 that couples to processor 430 to inform SOLD 400 which direction is up to assist in determining the orientation of SOLD 400. Other sensors 470 such as a gyroscope and/or compass may be coupled to processor 430 to assist SOLD 400 in determining orientation and direction of travel. It is noted that SOLD 400 with its three magnetic antennas 401, 402 and 403, may be useful while worn on the human body for location detection activities because the human body does not effectively short the magnetic signals that these antennas receive. The stages of SOLD 400 between magnetic antennas 401, 402 and 403 and processor 430 cooperate to supply processor 430 with signal characteristics information. This signal characteristics information may include received signal strength (RSSI) or amplitude of the three respective components provided by the three magnetic antennas 401, 402 and 403. The signal characteristics information may include phase information. For example, phase detectors in PLLs 461A, 461B and 461C may provide processor 430 with phase information for the three respective components provided by the three magnetic antennas 401, 402 and 403.

FIG. 5 is a flowchart that illustrates a representative "calibration mode" on the left side and a representative "location detection mode" on the right side. In "calibration mode", process flow commences at start block 500. The steps depicted in the flowcharts herein are not necessarily performed in the order drawn. A user places a signal-of-opportunity location detector (SOLD), such as SOLD 400, at a point $P_i$ with an orientation of $\phi_1$, as per block 505. A distant transmitter generates a signal-of-opportunity at a frequency of $f_j$, as per block 510. For example, a standard broadcast AM station transmits a signal on 550 KHz. The local environment near the SOLD perturbs the signal-of-opportunity, as per block 515. For example, nearby buildings, electric power lines or other structures interact with the signal.

The SOLD receives the perturbed signal-of-opportunity at a frequency of $f_j$, as per block 520. The SOLD stores reference data that characterizes the received signal as signal characteristics information in a reference data store 535, as per block 525. In this flowchart, reference data block 535 represents the reference data store conceptually. The reference data store represented by block 535 stores the signal characteristics information that is gathered in calibration mode as the SOLD changes from frequency to frequency at a particular location. The signal characteristics information may be stored together with the corresponding location information in table form within reference data store 535. The stored location information may include information with respect to the spatial orientation of the SOLD at each location. This information may be obtained from an accelerometer, gyro, or magnetic compass included in other sensors 470. After storing the signal characteristics information gathered at frequency $f_j$, the SOLD performs a test to see if there are other frequencies within the particular band of interest to be tested, as per decision block 530. If there are other frequencies remaining to be tested, then the SOLD advances to the next frequency, and process flow continues back to block 510. The SOLD gathers signal characteristics information for a station at this new frequency and stores this information in reference data store 535. Using this technique, SOLD may gather a large amount of information useful for geo-location, by advancing from frequency to frequency across the band to collect signal characteristic information for each frequency being correlated with a particular location in the reference data store.

After collection of signal characteristics information at all desired frequencies, process flow continues to decision block 540 at which the SOLD tests to determine if other locations remain to be tested for calibration purposes, as per decision block 540. If other locations remain to be tested, then the SOLD increments to the next $P_i$ position. More particularly, if other locations remain to be tested in the particular propagation environment, then the SOLD moves to the next location and cycles again through the frequencies of interest, gathering and storing signal characteristics information for each of those frequencies. This process continues until signal characteristics information has been gathered for all locations of interest in the particular propagation environment. The calibration process then ends, as per block 545.

Once the calibration process is complete and the signal characteristics information is stored in reference data store 535, the stored signal characteristics information may be used in "location detection mode" to locate the SOLD as it moves from place to place in the particular propagation environment. "Location detection mode" begins on the right side of the flowchart of FIG. 5 at start block 550. The SOLD is situated at location P with an orientation .phi., as per block 555. The distant transmitter generates a signal-of-opportunity at a frequency of f.sub.j in the local propagation environment, as per block 560. The local environment near the SOLD perturbs the signal-of-opportunity, as per block 565. As they did in calibration mode, the same nearby buildings, electric power lines or other obstructions interact with the signal to cause this perturbation. The SOLD receives the perturbed signal-of-opportunity at a frequency of f.sub.j, as per block 570.

The SOLD extracts signal characteristics information from the received signal at the frequency f.sub.j and compares this signal characteristics information with the signal characteristics information in the reference data store 535 to find the closest match. The location corresponding to the closest match between the current signal characteristics information and the signal characteristics information in the reference data store represents the current location of the SOLD, as per block 575. After completing this matching for one received frequency, the SOLD cycles through other frequencies of interest, as per decision block 580. This same matching test is performed by the SOLD for other frequencies of interest in the particular propagation environment that reference data store 535 covers. In other words, for each of the frequencies of interest that reference data base 535 stores for a particular propagation environment or region, the SOLD matches the received signal characteristics information with the stored signal characteristics information for that frequency to determine the best match current location at that frequency. Ideally, the locations determined by the matching process at each frequency should refer to the same location. In one alternative embodiment, the SOLD may determine the current location to be the location to which the majority of the matches indicate, or employ other selection criteria. While the matching process may be conducted while the SOLD is cycling through the various frequencies, in an alternative embodiment the SOLD may wait until signal characteristics information is determined for all frequencies before performing the matching process to find the current location. In such an embodiment, the order of determine location block 575 and next frequency block would be inverted. In that case, when the SOLD completes its cycling though of the frequencies of interest in the particular propagation environment and determines the current location, the location detection process ends at block 590.

Near-Field Electromagnetic Ranging and Location

Figure 6:
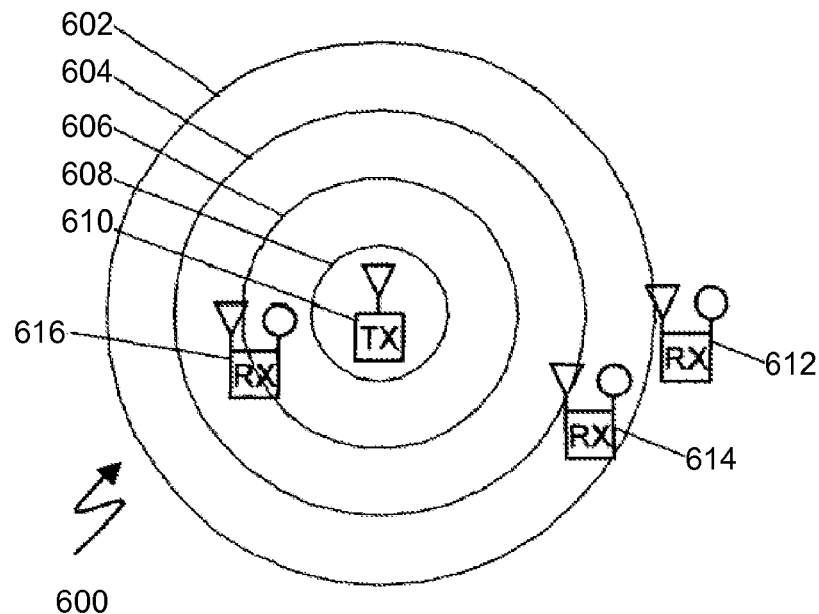
FIG. 6 is a schematic diagram illustrating the uniform variation of near field comparisons in an open field environment.

Near field electromagnetic ranging uses comparisons between two or more near field signal characteristics that vary in a predictable way with respect to distance or position. As explained in applicant's earlier work on near field electromagnetic ranging, one particularly useful comparison is between electric and magnetic field phase. This phase delta between electric and magnetic phase varies in a non-linear but predictable fashion within the near field. About a small electric antenna (small relative to ¼ wavelength), for instance, the phase delta varies with range, but does not vary with respect to angle, such as azimuth angle. FIG. 6 is a schematic diagram illustrating the uniform variation of near field comparisons in an open field environment. In a typical open near field propagation environment 600, the magnitudes of near field comparisons form uniform circular contours 602-608 around a transmitter 610 (Antennas are shown co-located with the transmitters and receivers), i.e. the near field comparison magnitude shown in FIG. 6 varies with range from the transmitter, but is the same value for any angle, such as azimuth angle, about the center transmitter. Receivers within a near field range of transmitter 610 such as receivers 612-616 detect near field signals, effect a comparison between two or more near field signal properties, and locate transmitter 610. Such near field properties may include but are not limited to electric field intensity, and magnetic field intensity. Comparisons may include but are not limited to relative phase angles and amplitudes.

Figure 7:
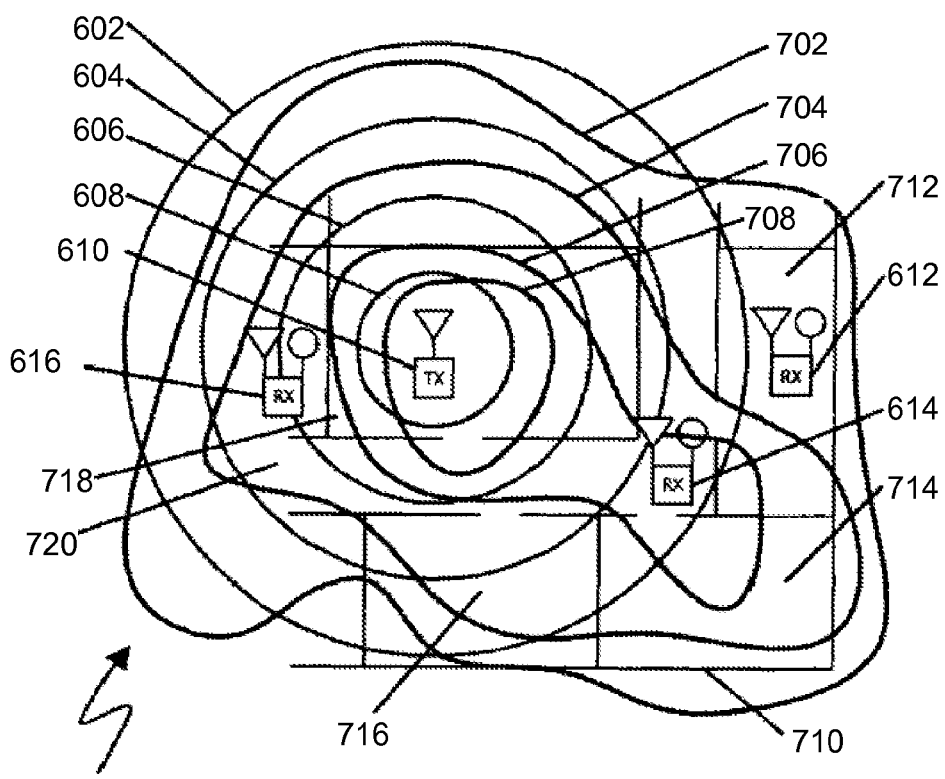
FIG. 7 is a schematic diagram depicting the distortions of near field comparisons in a cluttered and complicated propagation environment.

FIG. 7 is a schematic diagram depicting the distortions of near field comparisons in a cluttered and complicated propagation environment. In a typical cluttered near field propagation environment 700, the magnitudes of near field comparisons no longer form uniform circular contours 602-608 around a transmitter 610. Consider a typical propagation environment such as office environment 710. Office environment 710 comprises offices 712-718 and a hallway 720. In the presence of office environment 2010, the magnitudes of near field comparisons form distorted contours 702-708. Although distorted contours 702-708 vary slowly enough to enable ready correlation between a magnitude of a near field comparison and a position, distorted contours 702-708 no longer vary uniformly with respect to angle. Thus, if a near field electromagnetic ranging system were to operate in a typical cluttered near field propagation environment 700, a system and method for calibration of a near field electromagnetic ranging system offers the potential for improved accuracy.

FIG. 7 depicts office environment 710 as an example of a typical cluttered propagation environment. Similar behavior occurs in home and residential environments, business, retail, and industrial environments, and in the complicated propagation environment between and around stacked shipping containers just to name a few. Office environment 710 is an illustrative example. Nothing herein should be interpreted so as to limit application of the present invention to any particular environment.

A system for near-field electromagnetic ranging and location may be deployed in a variety of architectures. In a "fixed beacon-mobile locator" system architecture, a plurality of transmitters (like transmitter 610) may be deployed in and around a tracking environment like office environment 710. Then, mobile locator tags, like receivers 612-616 may be moved to known locations in support of a calibration method and the reference data or calibration data sets collected may be employed to determine location of the receivers in a near-field electromagnetic ranging and location system and method. In alternate embodiments, fixed beacon transmitters (like transmitter 610) may be supplemented or replaced by use of signals of opportunity as was first disclosed by Applicants in U.S. patent application Ser. No. 12/796,643 titled: "Method and apparatus for determining location using signals-of-opportunity" filed Jun. 8, 2010, now U.S. Pat. No. 8,018,383 issued Sep. 13, 2011. This U.S. Patent is incorporated herein by reference in its entirety.

In a fixed locator, mobile transmitter tag configuration, a plurality of receivers (like receivers 612-616) are installed throughout a tracking environment like office environment 710. Then mobile transmitter tags (like transmitter 610) may be associated with assets or persons to be tracked.

Figure 8:
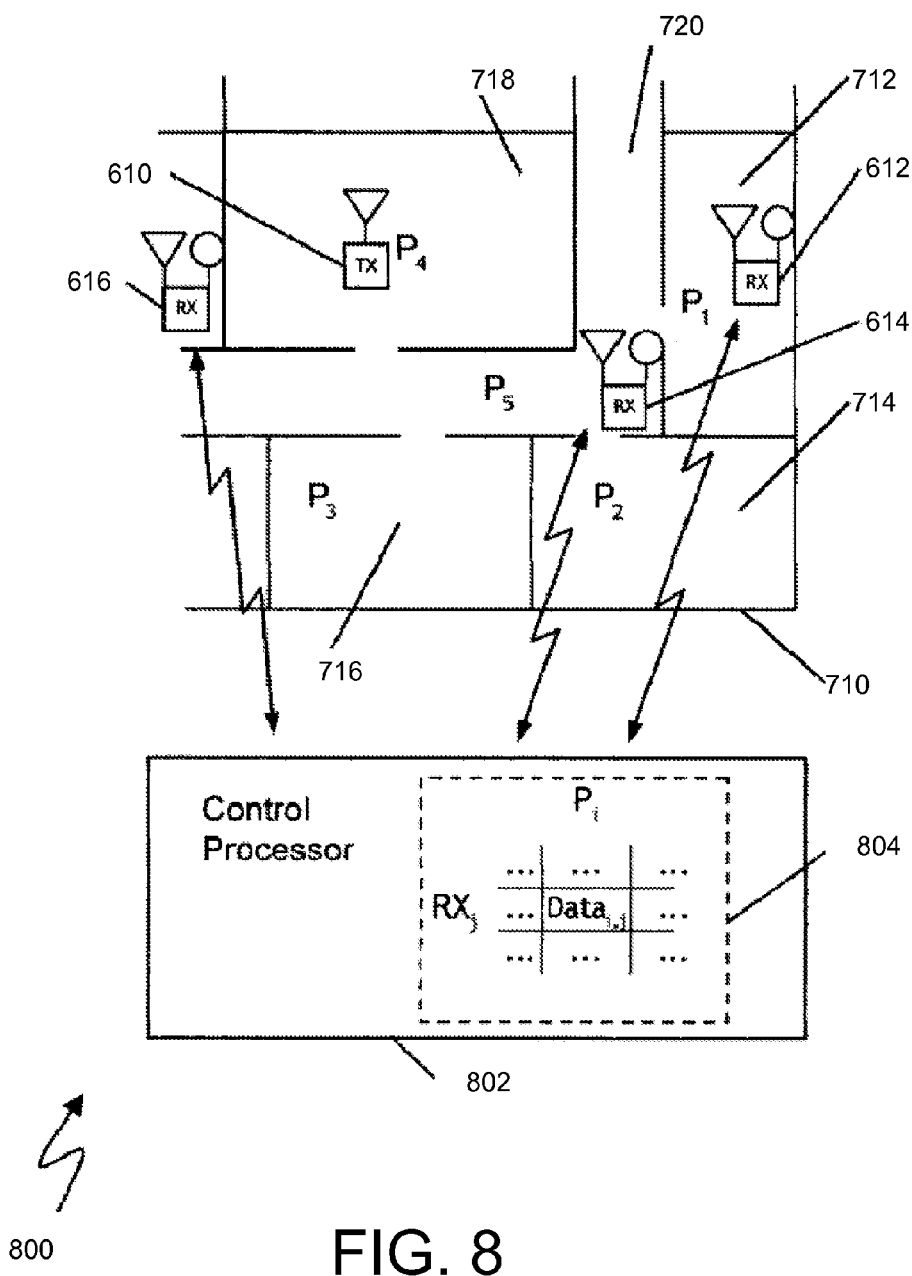
FIG. 8 is a schematic diagram showing how a near field electromagnetic ranging system may be calibrated by moving a reference transmitter to various points of interest within a cluttered and complicated propagation environment.

FIG. 8 is a schematic diagram showing how a near field electromagnetic ranging system may be calibrated by moving a reference transmitter to a sampling of points within a cluttered and complicated propagation environment. In FIG. 8, a calibration system 800 operates in a typical cluttered environment 710. Typical cluttered environment comprises a first office 712, a second office 714, a third office 716, a fourth office 718, and a hallway 720.

A reference transmitter 610 is moved to various points P.sub.1-P.sub.5 within the office environment 710. Although five points are shown in exemplary calibration system 800, in practice as many points as are necessary may be employed to achieve a desired level of precision. At each point, receivers 612-616 (also referred to as RX.sub.1-RX.sub.3) detect the near field beacon signals, effect a comparison between two or more near field signal properties, collect reference data regarding a magnitude of a near field comparison, and convey data to a control processor such as central controller 802. One skilled in the data processing and computational arts will realize that a wide variety of data structures and processing methods are possible within the bounds of the present invention. One embodiment preferred in many applications is for a central controller 802 to store a calibration set of measurements, which may also be called reference data, in a matrix 804. The matrix 804 stores reference data corresponding to measurements made by each receiver (RX.sub.j) as the reference transmitter 610 is moved to each point P.sub.1-P.sub.5 (P.sub.i). The matrix of reference data may also be referred to as a database. The database may be recorded on media or transmitted by network to make the data available at a later time or to additional users.

One skilled in the art will appreciate that the comparison may be performed by direct comparison of signals or by measurement of signals and comparison of measured values. The comparison may be done in the receiver or may be done in a separate processing unit. Likewise the comparison may be performed at the time of reception or at a later time. Thus, a comparison unit refers to any device or system that performs the comparison, either by analog or digital signal processing or by software processing.

Figure 9:
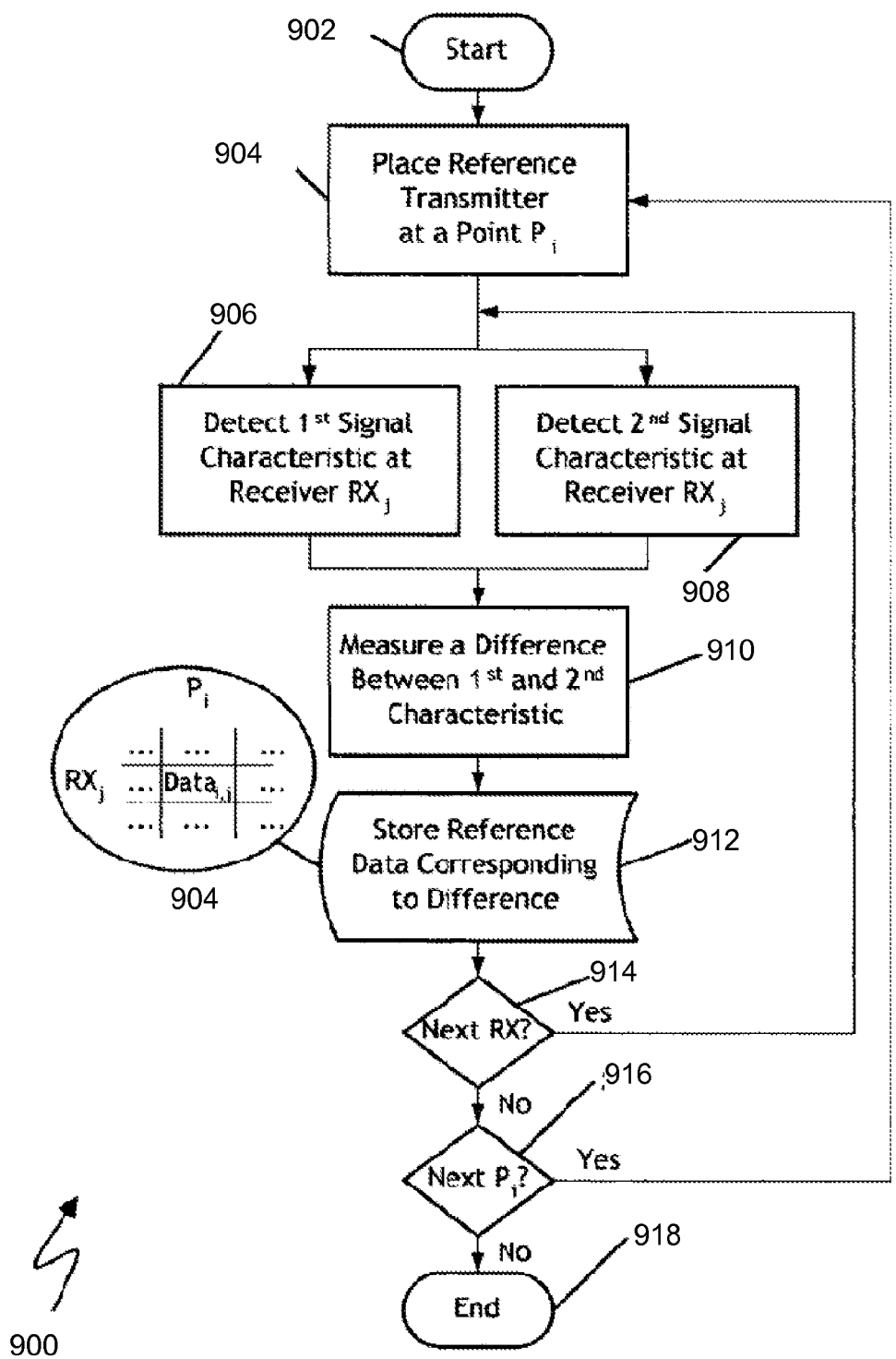
FIG. 9 is a flow diagram illustrating a calibration method for a near field electromagnetic ranging system.

FIG. 9 is a flow diagram illustrating a calibration method for a near field electromagnetic ranging system. Calibration method 900 begins at a start block 902. Calibration method 900 continues with a reference transmitter placed at a point P.sub.i as indicated by block 904. Calibration method 900 continues with (in no particular order) (1) detecting a first signal characteristic at receiver RX.sub.j as indicated by block 906, and (2) detecting a second signal characteristic at receiver RX.sub.j as indicated by block 908. Calibration method 900 continues with measuring a difference between the first and second characteristic as indicated by block 910. Calibration method 900 continues with storing reference data (calibration data) corresponding to the difference as indicated in block 912. For instance, this storage may be effected by the receiver RX.sub.j conveying reference data to the central controller 802 for storage in the data matrix 804 (calibration data set 804). Calibration method 900 continues with a decision whether to proceed to the next receiver as indicated in block 916. If more receivers remain to be processed, the method continues after block 904 to collect reference data from another receiver. If all receivers have provided data then calibration method 900 continues with a decision whether to proceed to move a reference transmitter to another point. If yes, calibration method 900 continues at block 904 to place the reference transmitter at another point. If no, calibration method 900 terminates at termination block 920.

Figure 10:
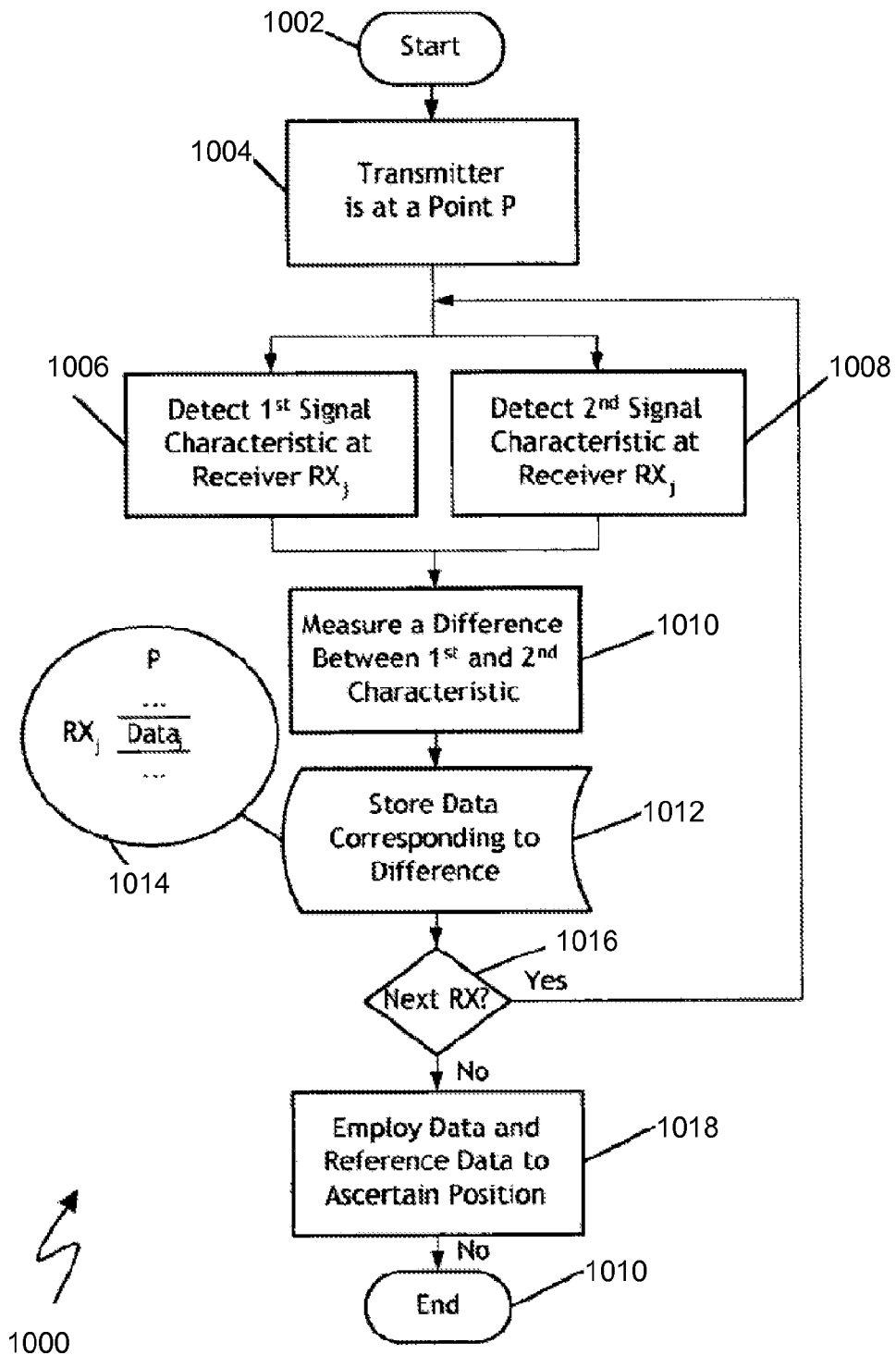
FIG. 10 is a flow diagram illustrating a method whereby reference data may be used in conjunction with a near field electromagnetic ranging system to ascertain a position.

Although exemplary calibration method 900 shows a particular process chosen for ease of explanation, alternate equivalent processes may accomplish the same desired end result. For instance, although calibration method 900 shows each receiver detecting, measuring and storing reference data in series, there is no reason why different receivers could not act substantially in parallel, simultaneously making measurements and conveying reference data for storage. In still further embodiments, signal amplitude data, orientation data, and other measurements pertinent to point P.sub.i may be included in additiona FIG. 10 is a flow diagram illustrating a method whereby reference data (equivalently a calibration data set) may be used in conjunction with a near field electromagnetic ranging system to ascertain a position. The method 1000 for calibrated near field electromagnetic ranging begins at a start block 1002. Method 1000 continues with the transmitter at a point P as indicated by block 1004. Method 1000 continues with (in no particular order) (1) detecting a first signal characteristic at receiver RX.sub.j as indicated by block 1006, and (2) detecting a second signal characteristic at receiver RX.sub.j as indicated by block 1008. Method 1000 continues with measuring a difference between the first and second characteristic as indicated by block 1010. Method 1000 continues with storing data corresponding to the difference as indicated in block 1012. For instance, this storage may be effected by the receiver RX.sub.j conveying data to a central controller 802 for storage in a transmitter position data vector 1014. Method 1000 continues with a decision whether to proceed to the next receiver as indicated in block 1016. If more receivers remain to be heard from, the method continues after block 1004 to collect data from another receiver. If all receivers have been heard from then method 1000 continues by employing data and reference data to calculate the position as indicated by block 1018. Method 1000 terminates at termination block 1020.

Although method 1000 shows one exemplary process, alternate equivalent processes may accomplish the same end result. For instance, although method 1000 shows each receiver detecting, measuring and storing data in series, there is no reason why different receivers could not act substantially in parallel, simultaneously making measurements and conveying data for analysis.

Figure 11:
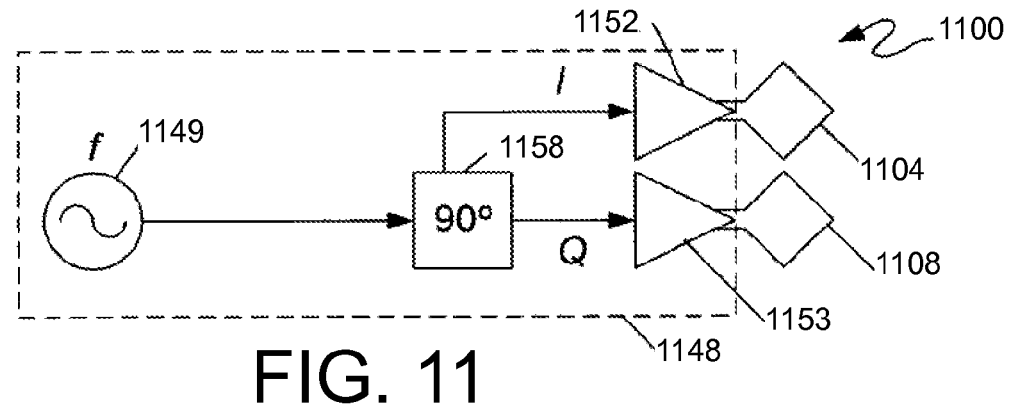
FIG. 11 is a block diagram showing a first alternate embodiment magnetic antenna transmission system for use in a positioning system.

FIG. 11 is a block diagram showing a magnetic antenna transmission system 1100 for use in a positioning system. First alternate embodiment magnetic antenna transmission system 1100 comprises oscillator 1149, quadrature splitter 1158, first power amplifier 1152, second power amplifier 1153, first magnetic antenna 1104, and second magnetic antenna 1108. In a preferred embodiment, first magnetic antenna 1104, and second magnetic antenna 1108 are arranged orthogonally. Transmitter system 1148 comprises oscillator 1149, quadrature splitter 1158, first power amplifier 1152, and second power amplifier 1153. Transmitter system 1148 is an example of an RF module.

Oscillator 1149 generates a sine wave signal at a frequency f and conveys a sine wave signal to a quadrature splitter 1158. Quadrature splitter 1158 yields a first in-phase signal I and a second quadrature signal Q. First power amplifier 1152 amplifies a first in-phase signal I and delivers a first in-phase signal I to first magnetic antenna 1104. Second power amplifier 1153 amplifies a second quadrature signal Q and delivers a second quadrature signal Q to second magnetic antenna 1108. Feeding a first in-phase signal I to first magnetic antenna 1104 and a second quadrature signal Q to second magnetic antenna 1108 enables a magnetic antenna transmission system 1100 to radiate substantially omnidirectional vertically polarized electromagnetic waves. First magnetic antenna 1104 and second magnetic antenna 1108 are preferably orthogonal magnetic antennas in a minimum coupling configuration. Details may be found in "Near-field location system and method," (Ser. No. 11/272,533, filed Nov. 10, 2005, now U.S. Pat. No. 7,307,595, issued Dec. 11, 2007).

Additional compact antenna designs are shown in applicant's "Space efficient magnetic antenna system," (Ser. No. 11/473, 595, filed Jun. 22, 2006, now U.S. Pat. No. 7,755,552 issued Jul. 13, 2010). Other antenna concepts of value in an RTLS and elsewhere are disclosed in Applicant's co-pending "Planar antenna system," (Ser. No. 12/857,528, Aug. 16, 2010), and "Space efficient magnetic antenna method," (Ser. No. 12/834,821, filed Jul. 12, 2010). Applicant's "Directive electrically small antenna system and method," (Provisional Patent Application 61/470,735 filed Apr. 1, 2011) presents further antennas of use in conjunction with an RTLS.

The main advantage of magnetic antenna transmission system 1100 is that it does not require any operation at frequencies higher than a preferred frequency f. This makes magnetic antenna transmission system 1100 suitable for use at higher frequencies, such as 13.56 MHz, where it becomes more difficult to implement digital alternatives.

Figure 12:
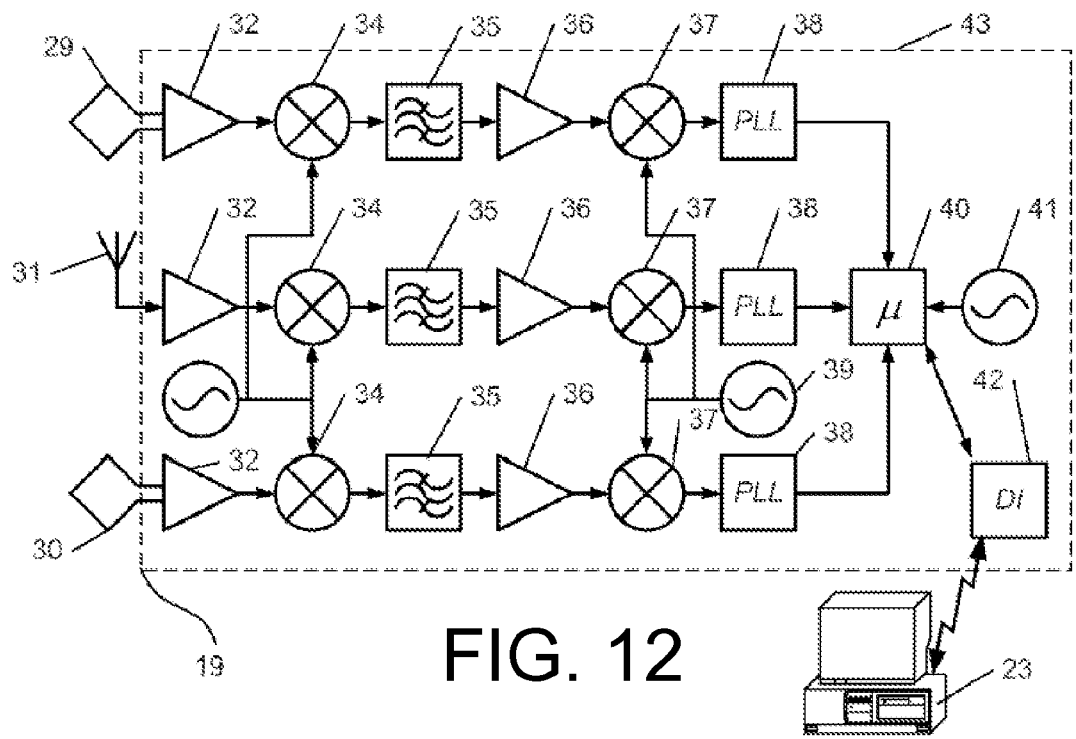
FIG. 12 is a functional block diagram showing an exemplary near field locator receiver for use in conjunction with an asset and personnel location, identification, and movement system.

FIG. 12 is a functional block diagram showing an exemplary near field locator receiver 19. In a preferred embodiment, locator receiver 19 comprises a first magnetic antenna 29, an electric antenna 31, a second magnetic antenna 30 (collectively, "three antennas"), and locator receiver board 43. Locator receiver board 43 comprises first (pre-) amplifiers 32, and first mixers 34 that mix RF signals from three antennas with a signal from first local oscillator 68 to yield intermediate frequency (IF) signals. Band pass filters 35 and second amplifiers 36 convey IF signals to second mixers 37 that mix IF signals with a signal from a second local oscillator to yield baseband signals. Phase lock loops 38 stabilize response, increase stability, and reduce noise of baseband signals. A microprocessor 40 compares baseband signals to timing signals from clock 41 to measure phase differences between baseband signals. In one embodiment, the signals E, H1, H2, EH1, and EH2 as described above being E field and H field magnitudes and phases are measured by the receiver. Microprocessor 40 conveys results to computer 23 via data interface 42. Data interface 42 may be a wired or wireless data network capable of transferring data between microprocessor 40 and computer 23.

Applications

In a fixed beacon-mobile locator embodiment, low-power, low-frequency beacon transmitters may be deployed throughout a tracking environment. A locator-receiver tag associated with assets or individuals detect and measure signals from the beacon transmitters and determine the tag's location. In still further embodiments the beacon transmitters are supplemented by or even replaced by signals from uncooperative transmitters—signals-of-opportunity that may be present within the tracking environment. These signals of opportunity may be from such sources as unintentional noise emitters or AM broadcast stations.

A fixed beacon-mobile locator system is advantageous when one wishes to track a limited number of assets, or if one wishes position, location, navigation, or guidance information to be available at a potentially large number of mobile locations. A fixed beacon-mobile locator system is suitable for providing a user (with a locator 612-616) with fast updates of position within an area around or throughout which a plurality of beacons (e.g., beacon 616) have been deployed. A variety of applications are possible. For purposes of illustration and not for limitation, a few applications are listed below.

For example, fixed beacons 610 may be deployed in and around a golf course, a lawn, a farm, or another area in which precision guidance of equipment is desired. Locator 612 may be placed on a robotic tractor, mower, golf ball gatherer, harvester, fertilizer, or other equipment. Locator 612 may be used in a guidance or navigation system for such equipment. Locator 612 may also be used to keep track of golf carts, or other assets. Locator 612 may be used to assist golfers or others in determining their location and in particular their location relative to a golf hole or another landmark of interest.

Fixed beacon 610 may be deployed in and around a mall, store, museum, business, amusement park, urban area, park, wilderness area, harbor, lake, property, home, apartment or another area or facility in which one wishes individuals or equipment to be able to monitor their location or position. Locator 612 may be carried by an individual so that an individual may monitor his or her own location or a location of another individual (such as a family member, friend, or other individual of interest). Locator 612 may also be carried by an individual so that an individual may determine their location relative to a landmark or other point or points of interest. Locator 612 may be incorporated in a device that provides a user with location-specific information such as a price or other information pertinent to a nearby object for sale, review, or evaluation. Locator 612 may be incorporated in a device that provides a user with location-specific information describing a nearby attraction, display, exhibit, hazard, or other feature of potential interest.

Locator 612 may be incorporated into a vehicle to provide position, guidance, or navigation information. An example is a precision guidance or navigation system for aircraft such as unmanned aerial vehicles (UAV), boats, automobiles, unmanned ground vehicles (UGV) or other vehicles.

In a fixed locator-mobile beacon embodiment, low-power, low-frequency transmitter tags may be associated and with assets or individuals. A network of locator receivers throughout a tracking environment detect and measure signals from the tags, and a server determines the tag's location, making the data available for a wide variety of applications. A plurality of fixed locators (e.g., locators 612, 614, 616) may be deployed in and around a particular area of interest within which one wishes to track a plurality of beacons (e.g., beacon 610) attached to assets of interest.

Location system 600 is well suited for tracking cars, rental equipment, parts, components, tools or other assets in a manufacturing facility, a retail lot, warehouse, hold, vehicle, cargo container, storage area, hospital, or other facility in which one desires to track assets. A respective mobile beacon 610 may be placed in each car, piece of rental equipment, part, component, tool, or other asset whose location is desired to be known. A locator such as locator 612 may be associated with a traffic signal, toll booth, or other traffic related infrastructure and may monitor a respective mobile beacon 610 in an approaching emergency vehicle, bus, or car thus allowing precision control of a traffic signal, or other monitoring of the situation. It is useful to note here that electromagnetic signals associated with location system 600 may be modulated to include information, such as identifying information relating to an asset to which a mobile beacon is attached. In such manner, various assets bearing respective mobile beacons 610 may be individually identified or authenticated within ranging system 600.

Further, a plurality of fixed locators (e.g., locators 612, 614, 616) may be deployed in and around a particular area of interest within which one wishes to track a plurality of beacons (e.g., beacon 610) attached or associated with people. Thus, location system 600 is well suited for tracking emergency responders such as firefighting, police, SWAT team members, and medical personnel at an incident scene. Location system 600 can be used to track employees in a hazardous environment like miners in a mine, workers at a facility where hazardous materials are present, or corrections officers or prisoners in a prison. Location system 600 may also be used to track patients, doctors, or other key personnel or equipment in a hospital, nursing home, or other institution.

In still another exemplary application, location system 600 may track skiers at a ski area, allowing skiers to be readily located even in case of an avalanche or other emergency. Similar applications include tracking hikers, climbers, skydivers, hunters, fishermen, outdoorsmen, and others who engage in potentially dangerous activities and might require rescue or assistance.

Patrons may be tracked at an amusement park, museum, festival, sporting event, convention, meeting, or other assembly drawing crowds. Sports competitors such as football players, soccer players, baseball players, swimmers, runners, and participants in other sports may have their positions monitored to assist in officiating, coverage, or analysis of a sporting event. Sporting equipment or animals might be tracked, including, by way of example and not by way of limitation, footballs, baseballs, soccer balls, rugby balls, race cars, yachts, thoroughbreds, or greyhounds.

Key personnel may be located in a business or other facility. Children and others requiring supervision may be monitored around a home, neighborhood, school, campus, or other facility. Location system 600 is also applicable to a personal emergency response system (PERS), allowing rescuers to quickly locate an individual in need of assistance, such as a patient who has wandered away from a nursing home. Prisoners may be tracked as part of a home release or other low security supervision program. Persons subject to restraining orders or other restrictions on their movements may be monitored to prevent their violating terms of their restrictions.

Location system 600 may also be used to track a pet as part of a pet containment system, or to allow an owner to monitor a pet's location. Wildlife may be tracked as part of a conservation project, research effort, or for other reasons. Location system 600 may also be used to track and monitor livestock or other domesticated animals.

Method of Near-Field Electromagnetic Ranging and Location

A usual office environment has a multipath delay spread of about 4-25 ns [K. Siwiak and Y. Bahreini, *Radiowave Propagation and Antennas for Personal Communications*, 3rd ed., (Boston: Artech House, 2007), p. 251]. This corresponds to 1.2 m-7.5 m error for time-of-flight location systems. Also, for typical microwave signals (assume f=2.4 GHz and λ=12.5 cm), even the most modest delay spread means phase is essentially uncorrelated and amplitude varies wildly on a distance scale of approximately a half wavelength. For a low frequency, long wavelength signal (assume f=1 MHz and λ=300 m) however, the typical indoor delay spread yields modest phase perturbations of about 1-9 deg and only gradual variations in amplitude. The Inventors have discovered that the long-wavelength, low-frequency nature of near-field signals means that these signals yield relatively gradual and monotonic perturbations even in cluttered indoor propagation environments. Thus, near-field RF-fingerprinting approach yields precise geolocation indoors by interpolation between a relatively sparse set of calibration points. The Inventors have achieved rms accuracy on the order of 25-50 cm with a calibration density of about 1-3 m in NFER systems operating at AM band frequencies in the neighborhood of 1 MHz.

A method for near-field electromagnetic ranging and location includes location of a Transmit Tag employing an infrastructure of Locator-Receivers and location of a Receive Tag employing an infrastructure of Beacon Transmitters. Each flavor of near-field electromagnetic ranging and location exploits the basic physics of near-field signal propagation in to yield high-accuracy location data in cluttered environments.

Figure 13:
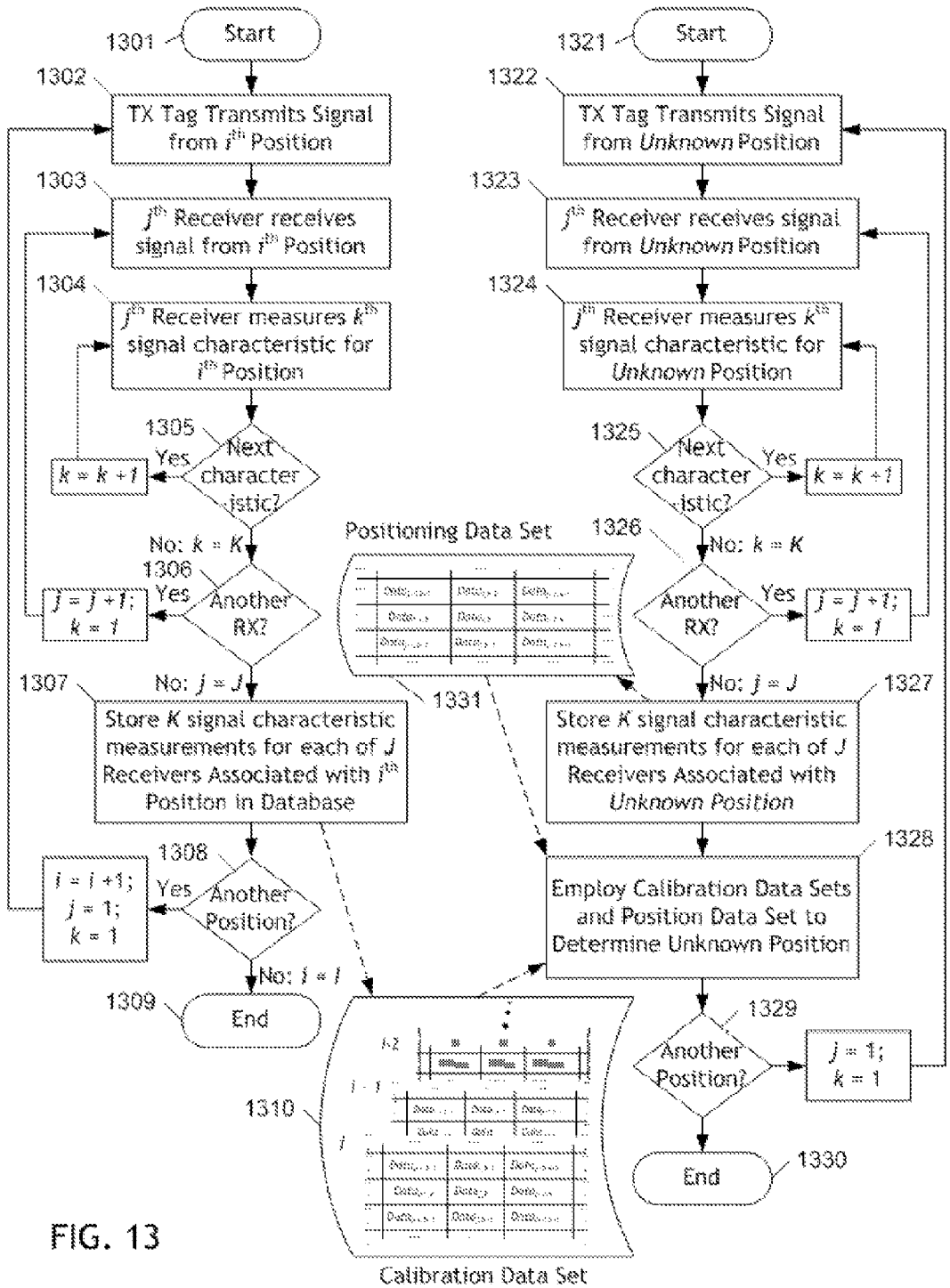
FIG. 13 is a flowchart for Fixed Locator-Receiver, Mobile Tag Near Field Electromagnetic Ranging and Location that illustrates a representative "calibration mode" on the left side and a representative "location detection mode" on the right side.

FIG. 13 is a flowchart for Fixed Locator-Receiver, Mobile Tag Near Field Electromagnetic Ranging and Location that illustrates a representative "calibration mode" on the left side and a representative "location detection mode" on the right side. In "calibration mode", process flow commences at start block 1301. The steps depicted in the flowcharts herein are not necessarily performed in the order drawn.

The process flow continues with a Transmit Tag (like Transmit Tag 1100) transmitting a calibration transmission from the $i^{th}$ position in block 1302. Then in block 1303, the $j^{th}$ Locator-Receiver (like Locator-Receiver 1200) receives the calibration transmission. The $j^{th}$ Locator-Receiver measures the $k^{th}$ signal characteristic for the $i^{th}$ position in block 1304. In typical embodiments, K=6 inclusive of the three amplitudes from three orthogonal antennas and the three phase differences between signals from the three orthogonal antennas. In typical embodiments, J=3-6 although with reduced accuracy a single locator-receiver (i.e. J=1) may suffice determine the unknown position of a Transmit Tag. In a preferred embodiment, a calibration transmission is also a near-field signal. A near-field signal is one in which the source of the transmission is within near-field range of a locator-receiver. Near-field range is defined as a range sufficiently small that near-field characteristics are evident in a received signal. Typically this is less than one wavelength from the source of the transmission, whether that source is a transmit tag, a beacon, or a scatterrer that regenerates a near-field signal from interaction with a more distant emitter.

The process flow continues with decision block 1305. If all K characteristics have not yet been measured, then the process continues back at block 1304 with measuring the $(k+1)^{th}$ characteristic. Otherwise, the process continues with decision block 1306. If additional Locator-Receivers are available, the process may continue at block 1303 with the $(j+1)^{th}$ Locator-Receiver receiving a calibration transmission from the Tag Transmitter at the $i^{th}$ position. If all J Locator-Receivers have completed their measurements, then the process continues at block 1307 with storing K signal characteristics for each of the J Locator-Receivers for the $i^{th}$ position in Calibration Data Set 1310. An associator associates Calibration Data Set 1310 with the $i^{th}$ position. An associator provides truth data for the calibration mode allowing a processor or information handling system (IHS) to associate the Calibration Data Set with the $i^{th}$ position. In a preferred embodiment, an associator may be a user or implementer of the calibration mode, designating truth data via a graphical user interface. In alternate embodiments, an alternate source of location data such as an inertial navigation system or GPS may work with the HIS to perform the association.

If all I positions have not yet been characterized, then the process continues back at block 1302 with the Transmit Tag transmitting a calibration transmission from the $(i+1)^{th}$ position. Otherwise, the calibration mode process terminates in End Block 1309.

A "location detection mode" begins on the right side of the process flow diagram with Start Block 1321. The process flow continues with block 1322 in which the Transmit Tag transmits a location transmission from an unknown location. Then the process flow continues with the $j^{th}$ Locator-Receiver receiving the location transmission from the unknown position in block 1323. In block 1324 the $j^{th}$ Locator-Receiver measures the $k^{th}$ signal characteristic associated with the unknown position.

The process flow continues with decision block 1325. If all K characteristics have not yet been measured, then the process continues back at block 1324 with measuring the $(k+1)^{th}$ characteristic. Otherwise, the process continues with decision block 1326. If additional Locator-Receivers are available, the process may continue at block 1323 with the $(j+1)^{th}$ Locator-Receiver receiving a location transmission from the Tag Transmitter at the unknown position. If all J Locator-Receivers have completed their measurements, then the process continues at block 1327 with storing K signal characteristics for each of the J Locator-Receivers for the unknown position in Positioning Data Set 1331. In a preferred embodiment, a location transmission is also a near-field signal.

The process flow continues in block 1328 with employing Calibration Data Set 1310 and Positioning Data Set 1331 to determine the unknown position. Complicated propagation environments do tend to perturb the near-field phase relations upon which NFER® systems rely. Applicants have overcome this problem using calibration methods described in "Near-field electromagnetic positioning system and method" (Ser. No. 10/958,165, filed Oct. 4, 2004, now U.S. Pat. No. 7,298,314, issued Nov. 20, 2007). Additional calibration details are provided in applicant's "Near-field electromagnetic positioning calibration system and method" (Ser. No. 11/968,319, filed Nov. 19, 2007, now U.S. Pat. No. 7,592,949, issued Sep. 22, 2009). Still further details of this calibration are provided in applicant's co-pending "Near-field electromagnetic calibration system and method" (Ser. No. 12/563,960 filed Sep. 21, 2009, now U.S. Pat. No. 7,859,452, issued Dec. 28, 2010).

Nothing in this disclosure should be construed so as to require the beacon transmitter or transmit tag employed in the location determination mode to be the same beacon transmitter or transmit tag as that employed in the calibration mode. In practice, many different yet functionally equivalent beacon transmitters may tracked using a common calibration data set.

If another position needs to be determined, then the process continues back at block 1322 with the Transmit Tag transmitting a location transmission from another unknown position. Otherwise, the location determination mode process terminates in End Block 1330.

FIG. 14 is a flowchart for Fixed Beacon Transmitter, Mobile Locator-Receiver Near Field Electromagnetic Ranging and Location that illustrates a representative "calibration mode" on the left side and a representative "location detection mode" on the right side. In "calibration mode," process flow commences at start block 1401. The steps depicted in the flowcharts herein are not necessarily performed in the order drawn.

The process flow continues with the $j^{th}$ Transmit Beacon transmitting a calibration transmission in block 1402. The Transmit Beacon may be an intentionally placed fixed beacon (like Transmit Beacon 610 if secured in a fixed location), or a locally scattered near-field signal from a distant source (like AM tower 125). Then in block 1403, the Locator-Receiver tag (for instance, Locator-Receiver Tag 400) receives the calibration transmission with the Locator-Receiver tag in the $i^{th}$ position. The Locator-Receiver at the $i^{th}$ position measures the $k^{th}$ signal characteristic of the $j^{th}$ Beacon in block 1404. In typical embodiments, K=6 inclusive of the three amplitudes from three orthogonal antennas and the three phase differences between signals from the three orthogonal antennas. In typical embodiments, J=6–12 depending on the availability of beacon signals, although with reduced accuracy a single locator-receiver may suffice determine its unknown position from a single beacon signal (i.e. J=1). In a preferred embodiment the calibration transmission is a near-field signal.

The process flow continues with decision block 1405. If all K characteristics have not yet been measured, then the process continues back at block 1404 with measuring the next, i.e. $(k+1)^{th}$, characteristic. Otherwise, the process continues with decision block 1406. If additional calibration transmissions (or beacon signals) are available, the process may continue at block 1403 with the Locator-Receiver at the $i^{th}$ position receiving a calibration transmission from the $(j+1)^{th}$ Beacon Transmitter. If all J available Beacon Signals have been measured, then the process continues at block 1407 with storing K signal characteristic measurements for each of the J Beacon Signals at the $i^{th}$ position in the plurality of Calibration Data Sets 1410. An associator provides truth data for the calibration mode allowing a processor or information handling system (IHS) to correlate the Calibration Data Set with the known $i^{th}$ position. Additional data or measurements including orientation or other sensor data may also be associated with the $i^{th}$ position in the plurality of Calibration Data Sets 1410.

If all I desired positions have not yet been characterized, then the process continues back at block 1402 with the first (j=1) Beacon transmitting a calibration transmission to be received by a Locator-Receiver Tag at the $(i+1)^{th}$ position. Otherwise, the calibration mode process terminates in End Block 1409.

A "location detection mode" begins on the right side of the process flow diagram with Start Block 1421. The steps depicted in the flowcharts herein are not necessarily performed in the order drawn. The process flow continues with $j^{th}$ Transmit Beacon transmitting a location transmission in block 1422. The Transmit Beacon may be an intentionally placed fixed beacon (like Transmit Beacon 610 if secured in a fixed location), or a locally scattered near-field signal from a distant source (like AM tower 125).

Then the process flow continues in block 1423 with the Locator-Receiver receiving the $j^{th}$ Transmit Beacon's location transmission (or beacon signal) at the unknown position. The Locator-Receiver at the unknown position measures the $k^{th}$ signal characteristic of the $j^{th}$ Beacon signal in block 1424.

The process flow continues with decision block 1425. If all K characteristics have not yet been measured, then the process continues back at block 1424 with measuring the $(k+1)^{th}$ characteristic. Otherwise, the process continues with decision block 1426. If additional Beacon Signals are available, the process may continue at block 1423 with the Locator-Receiver at the unknown position receiving a location transmission from the $(j+1)^{th}$ Beacon. If all J available Beacon Signals have been measured, then the process continues at block 1427 with storing K signal characteristics for each of the J Transmit Beacon's location transmissions in Positioning Data Set 1431. Positioning Data Set 1431 thus includes signal characteristics of beacon signals received by the Locator-Receiver at the unknown position. In a preferred embodiment the location transmission is a near-field signal. Also, nothing in this disclosure should be construed so as to require the locator-receiver employed in the location determination mode to be the same locator-receiver as that employed in the calibration mode. In practice, many different yet functionally equivalent locator-receivers may share a common calibration data set. Similarly, multiple locator-receivers may be employed in generating a particular calibration data set.

The process flow continues in block 1428 with employing Calibration Data Sets 1410 and Positioning Data Set 1431 to determine the unknown position. If another position needs to be determined, then the process continues back at block 1422 with the Transmit Tag transmitting a location signal from another unknown position. Otherwise, the location determination mode process terminates in End Block 1430.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. One should understand that numerous variations may be made by one skilled in the art based on the teachings herein. Thus, the breadth and scope of the present invention should not be limited by any of the above-described exemplary embodiments, but should be defined only in accordance with the following claims and their equivalents.

We claim:

1. A method for determining an unknown position of a beacon transmitter comprising:
   1) generating a plurality of calibration data sets, each calibration data set of said plurality of calibration data sets generated by:
      a) transmitting, by a beacon transmitter at a known position, a calibration transmission,
      b) receiving, by a locator-receiver, the calibration transmission,
      c) measuring, by the locator-receiver, a plurality of received signal characteristics of the calibration transmission to generate said calibration data set,
      d) associating, by an associator, said calibration data set with the known position,
   2) generating a positioning data set, said positioning data set generated by:
      a) transmitting, by the beacon transmitter at the unknown position, a location transmission,
      b) receiving, by the locator-receiver, the location transmission,
      c) measuring, by the locator-receiver, a plurality of received signal characteristics of the location transmission to generate said positioning data set associated with the unknown position, and
   3) determining, by an information handling system, said unknown position based on a comparison of said plurality of calibration data sets to said positioning data set.

2. The method for determining an unknown position as recited in claim 1 in which the calibration transmission and the location transmission are near-field signals.

3. The method for determining an unknown position as recited in claim 2 in which said received signal characteristics include a plurality of signal amplitudes.

4. The method for determining an unknown position as recited in claim 3 in which said received signal characteristics include a comparison of signal amplitudes.

5. The method for determining an unknown position as recited in claim 2 in which said received signal characteristics include a comparison of signal phases.

6. The method for determining an unknown position of claim 3 in which said received signal characteristics include a plurality of signal amplitudes.

7. A method for determining an unknown position of a locator-receiver comprising:
   1) generating a plurality of calibration data sets, each calibration data set of said plurality of calibration data sets generated by:
      a) transmitting, by a beacon transmitter, a calibration transmission,
      b) receiving, by a locator-receiver at a known position, the calibration transmission,
      c) measuring, by the locator-receiver at the known position, a plurality of received signal characteristics of the calibration transmission to generate said calibration data set,
      d) associating, by an associator, said calibration data set with the known position,
   2) generating a positioning data set, said positioning data set generated by:
      a) transmitting, by the beacon transmitter, a location transmission,
      b) receiving, by the locator-receiver at an unknown position, the location transmission,
      c) measuring, by the locator-receiver, a plurality of received signal characteristics of the location transmission to generate said positioning data set associated with the unknown position, and
   3) determining, by an information handling system, said unknown position based on a comparison of said plurality of calibration data sets to said positioning data set.

8. The method for determining an unknown position as recited in claim 7 in which the calibration transmission and the location transmission are near-field signals.

9. The method for determining an unknown position as recited in claim 8 in which the beacon transmitter is an uncooperative source of electromagnetic radiation.

10. The method for determining an unknown position as recited in claim 9 in which the uncooperative source of electromagnetic radiation is an AM broadcast signal.

* * * * *